US012633000B2

(12) United States Patent
Agarwal et al.

(10) Patent No.: US 12,633,000 B2
(45) Date of Patent: May 19, 2026

(54) TEXT-TO-IMAGE SYNTHESIS UTILIZING DIFFUSION MODELS WITH TEST-TIME ATTENTION SEGREGATION AND RETENTION OPTIMIZATION

(71) Applicant: Adobe Inc., San Jose, CA (US)

(72) Inventors: Aishwarya Agarwal, Bengaluru (IN); Srikrishna Karanam, Bangalore (IN); Joseph Koonthanam Jose, Kottayam (IN); Apoorv Umang Saxena, Bengaluru (IN); Koustava Goswami, Bangalore (IN); Balaji Vasan Srinivasan, Bangalore (IN)

(73) Assignee: Adobe Inc., San Jose, CA (US)

( * ) Notice: Subject to any disclaimer, the term of this patent is extended or adjusted under 35 U.S.C. 154(b) by 336 days.

(21) Appl. No.: 18/337,634

(22) Filed: Jun. 20, 2023

(65) Prior Publication Data

US 2024/0428468 A1 Dec. 26, 2024

(51) Int. Cl.
*G06T 11/00* (2026.01)
*G06N 3/0455* (2023.01)
(52) U.S. Cl.
CPC ............ *G06T 11/00* (2013.01); *G06N 3/0455* (2023.01)
(58) Field of Classification Search
CPC ... G06T 11/00; G06T 5/70; G06T 5/60; G06T 2207/20221; G06T 3/4046; G06N 3/0455; G06N 3/0464; G06N 3/0475
See application file for complete search history.

(56) References Cited

U.S. PATENT DOCUMENTS 11,809,523 B2 * 11/2023 Kastaniotis ......... G06F 18/2155
2025/0225700 A1 * 7/2025 Li .............................. G06T 5/60

FOREIGN PATENT DOCUMENTS

CN 113140023 A 7/2021
WO WO-2024243527 A1 * 11/2024 ........... G06V 10/774

OTHER PUBLICATIONS

Omri Avrahami, Dani Lischinski, Ohad Fried, Blended Diffusion for Text-driven Editing of Natural Images, 2022 IEEE/CVF Conference on Computer Vision and Pattern Recognition (Year: 2022).*

(Continued)

*Primary Examiner* — Weiming He
(74) *Attorney, Agent, or Firm* — Keller Preece PLLC

(57) ABSTRACT

The present disclosure relates to systems, methods, and non-transitory computer-readable media that utilizes attention segregation loss and/or attention retention loss at inference time of a diffusion neural network to generate a text-conditioned image. In particular, in some embodiments, the disclosed systems utilize the attention segregation loss to reduce overlap between concepts by comparing attention maps for multiple concepts of a text query corresponding to a denoising step. Further, in some embodiments, the disclosed systems utilize the attention retention loss to improve information retention for concepts across denoising steps by comparing attention maps between different denoising steps. Accordingly, in some embodiments, by utilizing the attention segregation loss and the attention retention loss, the disclosed systems accurately maintain multiple concepts from a text query when generating a text-conditioned image.

20 Claims, 13 Drawing Sheets

(56)                References Cited

OTHER PUBLICATIONS

Aaron Van Den Oord, et al. Neural discrete representation learning. Advances in neural information processing systems, 31st Conference on Neural Information Processing Systems, Nov. 2, 2017.

Aditya Ramesh, et al. Hierarchical text-conditional image generation with clip latents. arXiv preprint arXiv:2204.06125, Apr. 13, 2022.

Alec Radford, et al. Learning transferable visual models from natural language supervision. In International conference on machine learning, pp. 8748-8763. PMLR, Feb. 26, 2021.

Alex Nichol, et al. Glide: Towards photorealistic image generation and editing with text-guided diffusion models. arXiv preprint arXiv:2112.10741, Dec. 20, 2021.

Amir Hertz, et al. Prompt-to-prompt image editing with cross attention control. arXiv preprint arXiv:2208.01626, Aug. 2, 2022.

Ashish Vaswani, et al. Attention is all you need. Advances in neural information processing systems, 31st Conference on Neural Information Processing Systems, Jun. 12, 2017.

Chitwan Saharia, et al. Photorealistic text-to-image diffusion models with deep language understanding. arXiv preprint arXiv:2205.11487, May 23, 2022.

Colin Raffel, et al. Exploring the limits of transfer learning with a unified text-to-text transformer. The Journal of Machine Learning Research, 21(1):5485-5551, 2020.

Diederik P Kingma, et al. Auto-encoding variational bayes. arXiv preprint arXiv:1312.6114, Dec. 20, 2013.

Han Zhang, et al. Cross-modal contrastive learning for text-to-image generation. In Proceedings of the IEEE/CVF conference on computer vision and pattern recognition, pp. 833-842, Jan. 12, 2021.

Hila Chefer, et al. Attend-and-excite: Attention-based semantic guidance for text-to-image diffusion models. arXiv preprint arXiv:2301.13826, SIGGRAPH 2023, Jan. 31, 2023.

Huaibo Huang, et al. Introvae: Introspective variational autoencoders for photographic image synthesis. Advances in neural information processing systems, 31, Jul. 17, 2018.

Hui Ye, et al. Improving text-to-image synthesis using contrastive learning. arXiv preprint arXiv:2107.02423, Jul. 6, 2021.

Jonathan Ho, et al. Classifier-free diffusion guidance. arXiv preprint arXiv:2207.12598, Jul. 26, 2022.

Jun-Yan Zhu, et al. Toward multimodal image-to-image translation. Advances in neural information processing systems, 31st Conference on Neural Information Processing Systems, Nov. 30, 2017.

Jun-Yan Zhu, et al. Unpaired image-to-image translation using cycle-consistent adversarial networks. In Proceedings of the IEEE international conference on computer vision, pp. 2223-2232, Mar. 30, 2017.

Junnan Li, et al. Blip: Bootstrapping language-image pre-training for unified vision-language understanding and generation. In International Conference on Machine Learning, pp. 12888-12900. PMLR, 2022.

Minfeng Zhu, et al. Dm-gan: Dynamic memory generative adversarial networks for text-to-image synthesis. In Proceedings of the IEEE/CVF conference on computer vision and pattern recognition, pp. 5802-5810, Apr. 2, 2019.

Ming Tao, et al. Df-gan: A simple and effective baseline for text-to-image synthesis. In Proceedings of the IEEE/CVF Conference on Computer Vision and Pattern Recognition, pp. 16515-16525, 2022.

Nan Liu, et al. Compositional visual generation with composable diffusion models. In Computer Vision-ECCV 2022: 17th European Conference, Tel Aviv, Israel, Oct. 23-27, 2022, Proceedings, Part XVII, pp. 423-439. Springer, 2022.

Olaf Ronneberger, et al. U-950 net: Convolutional networks for biomedical image segmentation. In Medical Image Computing and Computer-Assisted Intervention—MICCAI 2015: 18th International Conference, Munich, Germany, Oct. 5-9, 2015, Proceedings, Part III 18, pp. 234-241. Springer, 2015.

Phillip Isola, et al. Image-to-image translation with conditional adversarial networks. In Proceedings of the IEEE conference on computer vision and pattern recognition, pp. 1125-1134, 2017.

Robin Rombach, et al. High-resolution image synthesis with latent diffusion models. In Proceedings of the IEEE/CVF Conference on Computer Vision and Pattern Recognition, pp. 10684-10695, 2022.

Ron Mokady, et al. Null-text inversion for editing real images using guided diffusion models. arXiv preprint arXiv:2211.09794, Nov. 17, 2022.

Sam Witteveen, et al. Investigating prompt engineering in diffusion models. arXiv preprint arXiv:2211.15462, Nov. 21, 2022.

Taesung Park, et al. Semantic image synthesis with spatially-adaptive normalization. In Proceedings of the IEEE/CVF conference on computer vision and pattern recognition, pp. 2337-2346, Mar. 18, 2019.

Tao Xu, et al. Attngan: Fine- grained text to image generation with attentional generative adversarial networks. In Proceedings of the IEEE conference on computer vision and pattern recognition, pp. 1316-1324, 2018.

Tero Karras, et al. A style-based generator architecture for generative adversarial networks. In Proceedings of the IEEE/CVF conference on computer vision and pattern recognition, pp. 4401-4410, 2019.

Tim Brooks, et al. In- structpix2pix: Learning to follow image editing instructions. arXiv preprint arXiv:2211.09800, CVPR 2023, pp. 1-15. Nov. 17, 2022.

Vivian Liu, et al. Design guidelines for prompt engineering text-to-image generative models. In Proceedings of the 2022 CHI Conference on Human Factors in Computing Systems, pp. 1-23, 2022.

Weixi Feng, et al. Training-free structured diffusion guidance for compositional text-to-image synthesis. arXiv preprint arXiv:2212.05032, Dec. 9, 2022.

Yaru Hao, et al. Optimizing prompts for text-to-image generation. arXiv preprint arXiv:2212.09611, Dec. 19, 2022.

Yu Zeng, et al. Scenecomposer: Any-level semantic image synthesis. arXiv preprint arXiv:2211.11742, Nov. 21, 2022.

Yuheng Li, et al. Gligen: Open-set grounded text-to-image generation. arXiv preprint arXiv:2301.07093, Jan. 17, 2023.

Zhengyuan Yang, et al. Reco: Region-controlled text-to-image generation. arXiv preprint arXiv:2211.15518, Nov. 23, 2022.

Zijie J Wang, et al. Diffusiondb: A large-scale prompt gallery dataset for text-to-image generative models. arXiv preprint arXiv:2210.14896, Oct. 26, 2022.

Combined Search and Examination Report as received in United Kingdom application No. 2405389.4 dated Sep. 10, 2024.

* cited by examiner

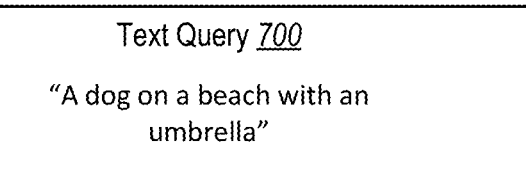
Text Query *700*
"A dog on a beach with an umbrella"
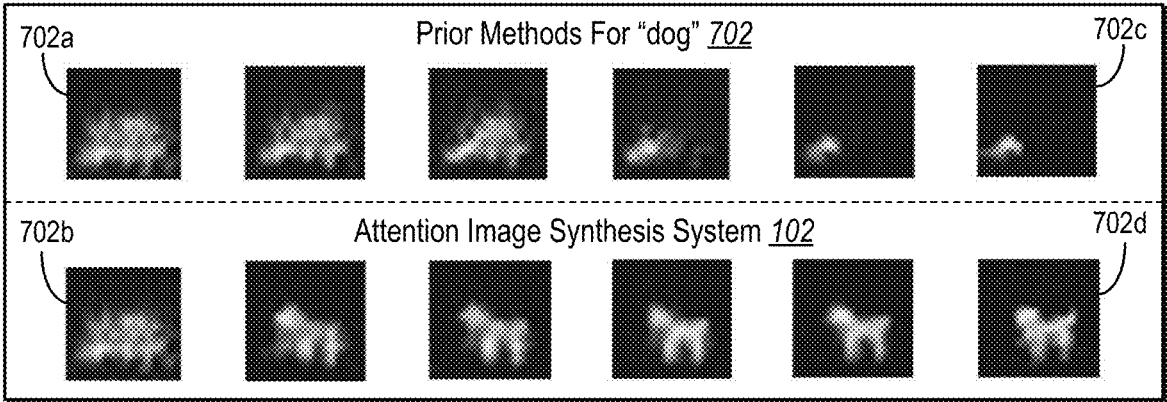
702a    Prior Methods For "dog" *702*    702c
702b    Attention Image Synthesis System *102*    702d
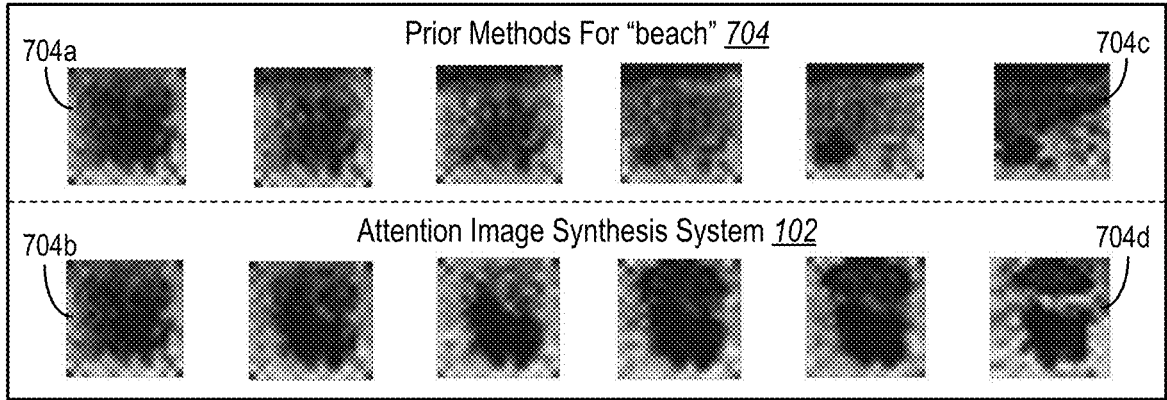
704a    Prior Methods For "beach" *704*    704c
704b    Attention Image Synthesis System *102*    704d
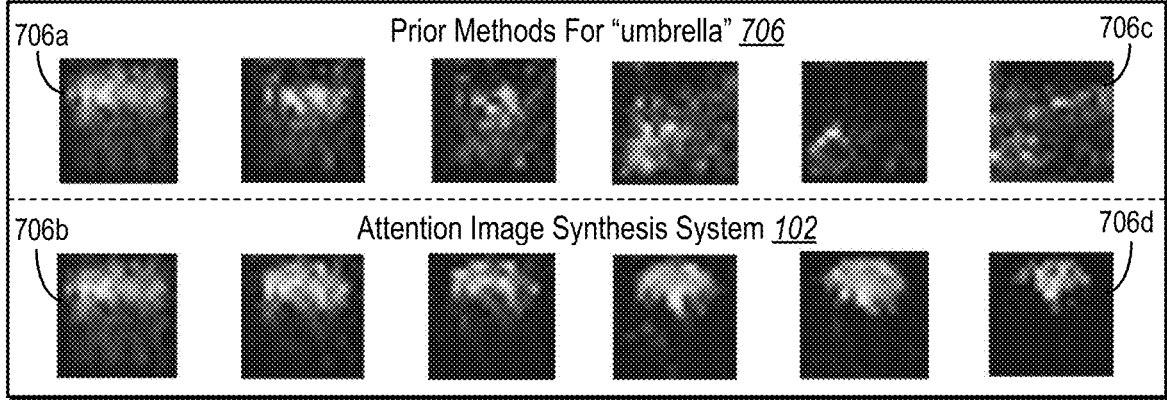
706a    Prior Methods For "umbrella" *706*    706c
706b    Attention Image Synthesis System *102*    706d
*Fig. 7*

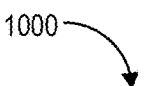
1000
| Method | Animal - Animal | Animal - Object | Object - Object |
|---|---|---|---|
| Stable | 0.76 (-7.9%) | 0.78 (-7.7%) | 0.77 (-6.5%) |
| Composable | 0.69 (-18.9%) | 0.77 (-9.1%) | 0.76 (-7.9%) |
| Structure | 0.76 (-7.9%) | 0.78 (-7.7%) | 0.76 (-7.9%) |
| Attend-Excite | 0.80 (-2.5%) | 0.82 (-2.4%) | 0.81 (-1.2%) |
| A-STAR | 0.82 | 0.84 | 0.82 |
1002
1002b  1002a
1002d
1002c
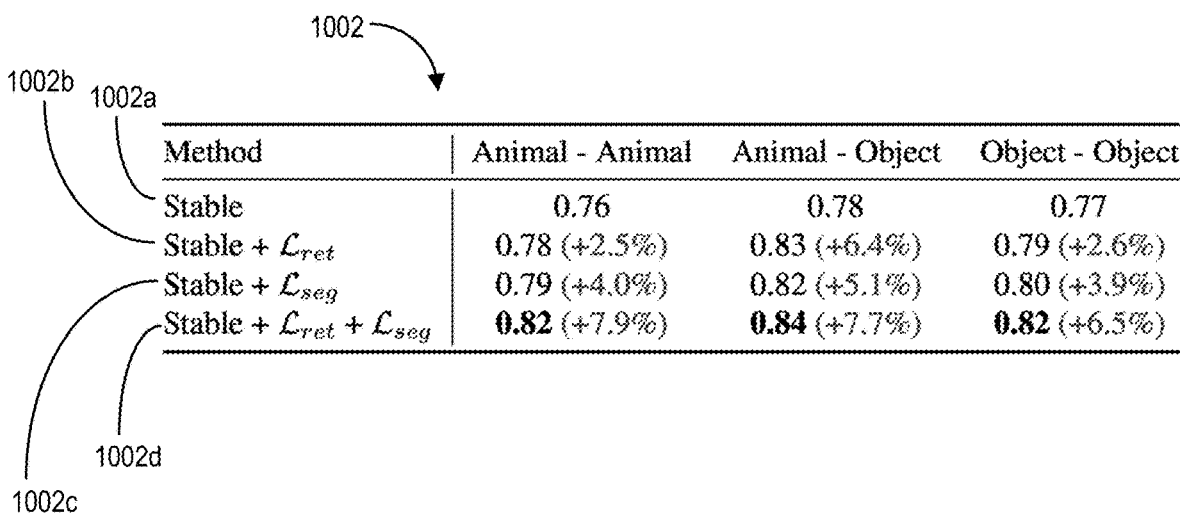
| Method | Animal - Animal | Animal - Object | Object - Object |
|---|---|---|---|
| Stable | 0.76 | 0.78 | 0.77 |
| Stable + $\mathcal{L}_{ret}$ | 0.78 (+2.5%) | 0.83 (+6.4%) | 0.79 (+2.6%) |
| Stable + $\mathcal{L}_{seg}$ | 0.79 (+4.0%) | 0.82 (+5.1%) | 0.80 (+3.9%) |
| Stable + $\mathcal{L}_{ret}$ + $\mathcal{L}_{seg}$ | 0.82 (+7.9%) | 0.84 (+7.7%) | 0.82 (+6.5%) |
*Fig. 10*

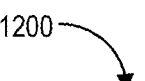

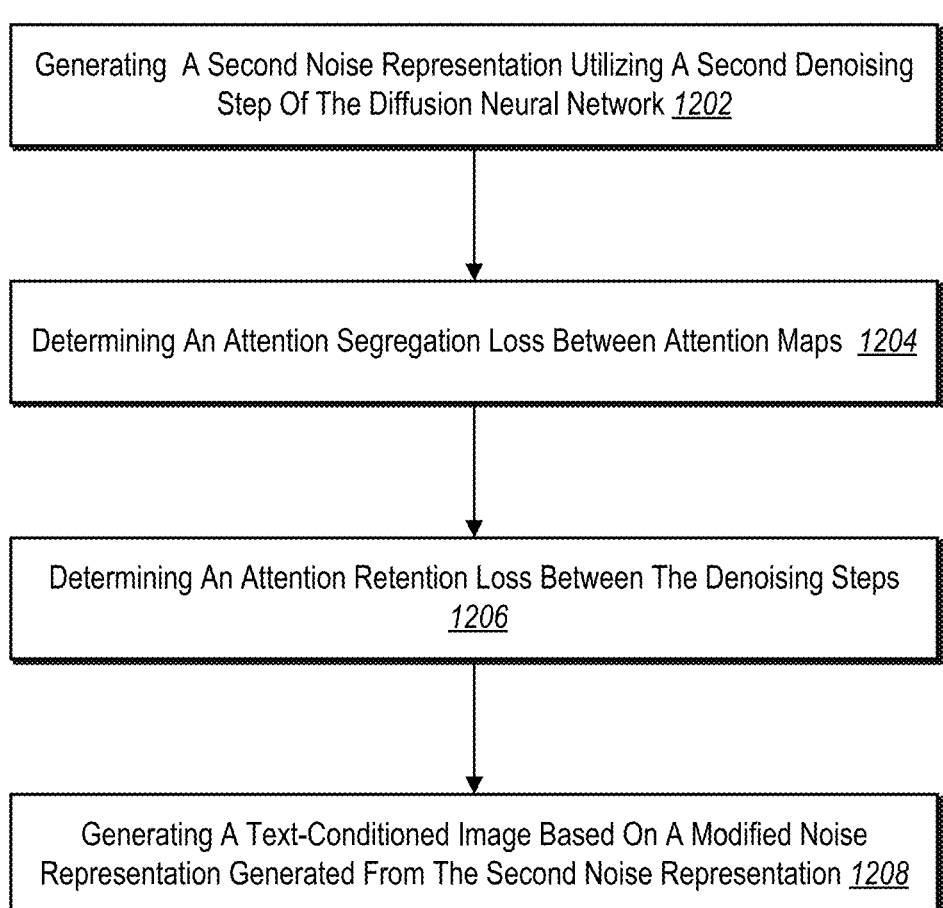

Generating A Second Noise Representation Utilizing A Second Denoising Step Of The Diffusion Neural Network *1202*

Determining An Attention Segregation Loss Between Attention Maps *1204*

Determining An Attention Retention Loss Between The Denoising Steps *1206*

Generating A Text-Conditioned Image Based On A Modified Noise Representation Generated From The Second Noise Representation *1208*

*Fig. 12*

TEXT-TO-IMAGE SYNTHESIS UTILIZING DIFFUSION MODELS WITH TEST-TIME ATTENTION SEGREGATION AND RETENTION OPTIMIZATION

BACKGROUND

Recent years have seen significant advancement in hardware and software platforms for text-to-image synthesis. For example, many software platforms utilize generative models to create images conditioned on free-form text inputs. Further, many of these generative models create plausible images from text description inputs. However, despite these advancements, existing software platform systems with generative models continue to suffer from a variety of problems with regard to computational accuracy and operational flexibility of implementing computing devices.

SUMMARY

One or more embodiments described herein provide benefits and/or solve one or more of the problems in the art with systems, methods, and non-transitory computer-readable media that implement attention segregation loss and/or attention retention loss at inference time to generate a text-conditioned image. In some embodiments, the disclosed systems utilize attention segregation loss and attention retention loss at inference time in intermediate denoising layers of a diffusion neural network for generating text-conditioned images. In particular, in some embodiments, the disclosed systems utilize the attention segregation loss to reduce overlap between concepts by comparing attention maps for multiple concepts of a text query corresponding to a specific denoising step. Further, in some embodiments, the disclosed systems utilize the attention retention loss to improve information retention for concepts across denoising steps by comparing attention maps between different denoising steps. Accordingly, in some embodiments, by utilizing the attention segregation loss and the attention retention loss, the disclosed systems accurately maintain multiple concepts from a text query when generating a text-conditioned image.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 7 illustrates example results of a comparison between attention maps for the attention image synthesis system and prior methods in accordance with one or more embodiments;

FIG. 10 illustrates an example experimental results for text-text similarities and ablation studies for the attention image synthesis system compared with prior methods in accordance with one or more embodiments;

FIG. 12 illustrates a flowchart of a series of acts for generating a text-conditioned image in accordance with one or more embodiments;

DETAILED DESCRIPTION

Figure 1:
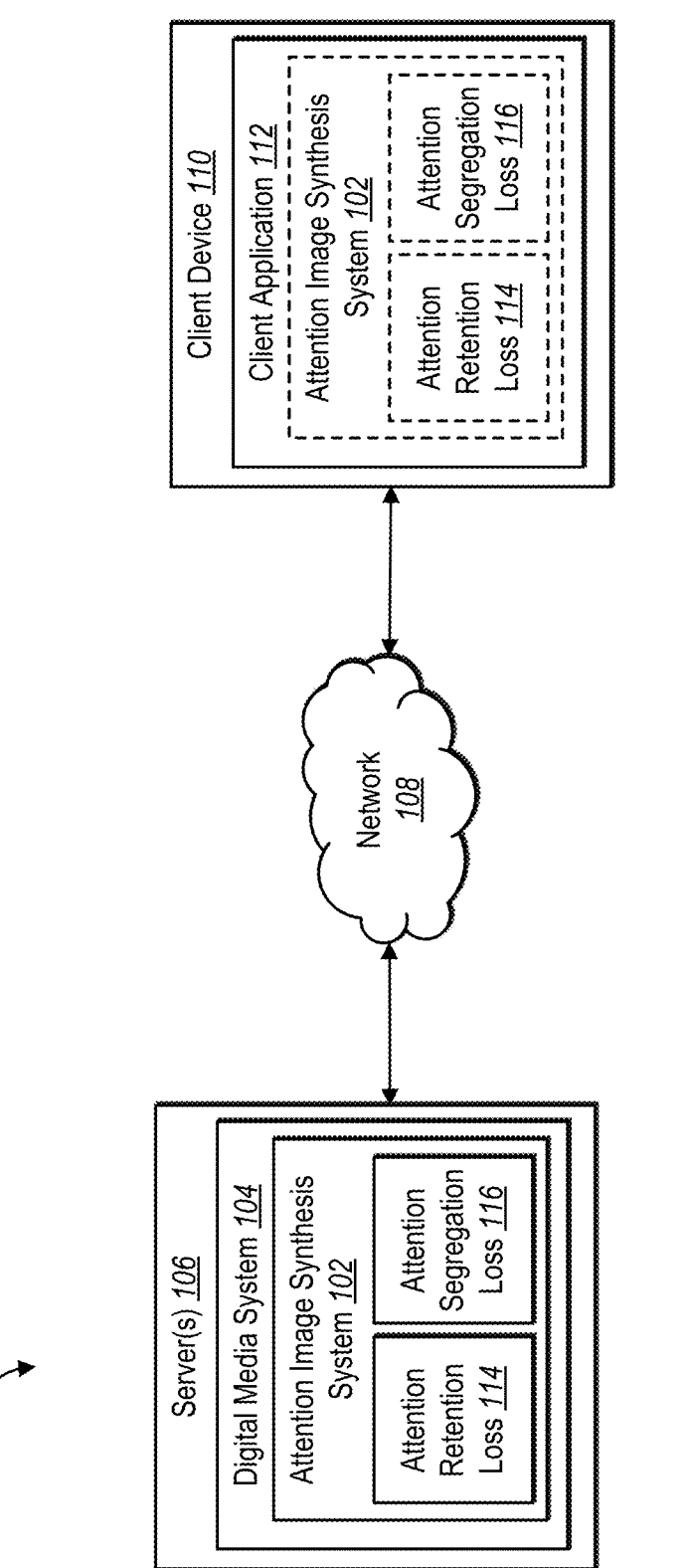
FIG. 1 illustrates an example environment in which an attention image synthesis system operates in accordance with one or more embodiments.

One or more embodiments described herein include an attention image synthesis system that implements attention segregation loss and/or attention retention loss within a diffusion neural network model at inference time to generate a text-conditioned image with multiple concepts. For example, the attention image synthesis system utilizes the attention segregation loss to reduce cross-attention overlap between attention maps of different concepts from a text query (e.g., a text prompt). Further, in some embodiments, the attention image synthesis system utilizes the attention retention loss to explicitly retain cross-attention information for all concepts from the text query across denoising steps to reduce information loss and preserve concepts when generating a text-conditioned image. For instance, in some embodiments, the attention image synthesis system determines the attention segregation loss by reducing the overlap of high-response regions (e.g., threshold activation regions) in cross-attention maps of concept pairs of a text query for a denoising step. Furthermore, in some embodiments, the attention image synthesis system determines the attention retention loss by generating a binary mask for each of the multiple concepts of the text query from a previous denoising step and comparing the binary mask with an attention map for each of the multiple concepts at a current denoising step (e.g., to ensure the attention maps are consistent with the binary mask). Accordingly, in some embodiments, the attention image synthesis system retains and segregates multiple concepts from the text query by utilizing the attention segregation loss and the attention retention loss to generate text-conditioned images.

As mentioned above, in one or more embodiments, the attention image synthesis system processes a text query (e.g., a text prompt). For example, the attention image synthesis system processes the text query upon receiving it from a client device to generate a text-conditioned image. For instance, in some embodiments, the text query from the client device includes multiple concepts (e.g., a dog and an umbrella). Moreover, in some embodiments the attention image synthesis system processes the text query by utilizing an encoder to generate a text query embedding. Further, in some embodiments the attention image synthesis system conditions each denoising step of a diffusion neural network with the text query embedding to generate a text-conditioned image.

As mentioned above, in one or more embodiments, the attention image synthesis system determines an attention segregation loss and an attention retention loss utilizing attention maps (e.g., cross-attention maps). For example, the attention image synthesis system processes a text query and generates a text query vector. Moreover, the attention image synthesis system compares the generated text query vector with a noisy vector. Based on the comparison, in one or more embodiments, the attention image synthesis system generates an attention map(s) and further determines an attention segregation loss/attention retention loss from the attention map(s) (e.g., attention map(s) either from the same denoising step or different denoising steps).

As mentioned above, in one or more embodiments, the attention image synthesis system determines the attention segregation loss by reducing (e.g., minimizing) the overlap of high-response regions. For example, the attention image synthesis system processes a text query that includes a first concept and a second concept and generates a first attention map for the first concept and a second attention map for the second concept. Moreover, in some embodiments, based on the first attention map and the second attention map, the attention image synthesis system determines the attention segregation loss. In particular, the attention image synthesis system compares the first attention map to the second attention map to reduce the overlap between the first concept and the second concept.

As mentioned above, in some embodiments, the attention image synthesis system determines the attention retention loss by generating a binary mask. For example, the attention image synthesis system generates a first attention map that corresponds to a first denoising step and generates a second attention map that corresponds to a second denoising step. Furthermore, in some embodiments the attention image synthesis system determines a high activation region (e.g., a threshold activation region) for the first attention map corresponding to the first denoising step and generates a binary mask. Moreover, in one or more embodiments, the attention image synthesis system compares the binary mask from the first denoising step to the second attention map corresponding to the second denoising step to determine the attention retention loss.

In one or more embodiments, the attention image synthesis system updates a latent space of a diffusion model to generate a modified noise representation. For example, the attention image synthesis system generates a noise representation utilizing a denoising step of the diffusion neural network. In particular, in some embodiments, the attention image synthesis system generates the noise representation from the text query and a previous noise representation. Furthermore, in one or more embodiments, the attention image synthesis system determines attention segregation loss and/or attention retention loss to modify the noise representation. For instance, in some embodiments the attention image synthesis system generates a modified noise representation from the noise representation (e.g., updates the latent space) using the attention segregation loss and/or attention retention loss based on the generated attention map(s).

As mentioned above, many conventional systems suffer from a number of issues in relation to computational inaccuracy, and operational inflexibility. For example, some existing text-image generation systems are inaccurate. For example, conventional text-image generation systems often generate text-conditioned images with concept(s) missing that were included in the initial text query. In particular, for text queries involving multiple concepts, conventional text-image generation systems generate attention maps (e.g., cross-attention maps) with a significant amount of overlap. For instance, for a text query with a first and a second concept, conventional text-image generation systems generate cross-attention maps with activation in the same pixel regions. Accordingly, conventional text-image generation systems are unable to distinguish between more than one concept. Thus, conventional text-image generation systems suffer from issue attention overlap which results in a final image with conflating, unrealistic concepts.

Furthermore, inaccuracy of conventional text-image generation systems is exacerbated due to attention decay. For example, across denoising steps, conventional text-image generation systems fail to retain concepts included within a text query. In particular, conventional text-image generation systems generate attention maps in earlier denoising steps with concepts activated, however in later denoising steps, the attention maps fail to continue to capture the concepts within the text query. Accordingly, in some instances, conventional text-image generation systems lose knowledge across the diffusion process which results in the inaccurate generation of text-conditioned images.

Relatedly, certain conventional text-image generation systems suffer from operational inflexibility. Indeed, for reasons similar to those described in relation to the inaccuracies of some prior systems, many prior systems are also rigidly limited to generating text-conditioned images with only a single concept. In particular, because some conventional text-image generation systems are unable to distinguish between multiple concepts (e.g., ignores some concepts in the final generation) and are unable to retain concepts across the generation process, conventional text-image generation systems are limited in operational flexibility.

As suggested, one or more embodiments of the attention image synthesis system provides several advantages over conventional text-image generation systems. For example, in one or more embodiments, the attention image synthesis system improves accuracy over prior systems. For example, as mentioned, conventional text-image generation systems suffer from issue attention overlap. In one or more embodiments, the attention image synthesis system overcomes issue attention overlap by determining an attention segregation loss between attention maps corresponding to a current denoising step. In particular, in some embodiments the attention image synthesis system generates an attention map for each concept of a text query and compares the attention maps for a denoising step to determine the attention segregation loss. In doing so, in one or more embodiments, the attention image synthesis system minimizes the overlap of concepts within text query. In other words, in some embodiments the attention image synthesis system explicitly segregates pixel regions that are highly activated (e.g., threshold activation region) for distinct concepts from a text query to capture information for the distinct concepts. Thus, in one or more embodiments, the attention image synthesis system generates a text-conditioned image that includes multiple concepts by implementing the attention segregation loss to overcome issue attention overlap prevalent in conventional text-image generation systems.

Furthermore, as mentioned, conventional text-image generation systems suffer from attention decay. For example, the attention image synthesis system overcomes the issue of attention decay by implementing attention retention loss. In particular, in some embodiments the attention image synthesis system determines an attention retention loss between different denoising steps to retain information across denoising steps. Further, in some embodiments the attention image synthesis system determines a first attention map for a first denoising step and a second attention map for a second denoising step. Moreover, in some embodiments the attention image synthesis system further determines an attention retention loss by comparing the first attention map and the second attention map. In some embodiments, the attention image synthesis system generates a binary mask for the first attention map corresponding to the first denoising step. Moreover, in one or more embodiments, the attention image synthesis system compares the binary mask for the first attention map to the second attention map corresponding to the second denoising step to ensure retention of information from one denoising step to another. In doing so, in some embodiments, the attention image synthesis system overcomes issues of attention decay and generates a final output (e.g., a text conditioned image) that contains distinct concepts from the text query.

In addition to accuracy improvements, in one or more embodiments, the attention image synthesis system improves operational flexibility over prior systems. For reasons similar to those described in relation to the accuracy improvements, the attention image synthesis system can flexibly adapt the generation of text-conditioned images even for text queries containing multiple concepts. Thus, in contrast to some prior systems that are rigidly fixed to generating text-conditioned images with a single concept, in one or more embodiments, the attention image synthesis system has a diverse capability to retain and segregate multiple concepts from a text query in the generation of a high-quality and accurate text-conditioned image.

Additional detail regarding the attention image synthesis system will now be provided with reference to the figures. For example, FIG. 1 illustrates a schematic diagram of an exemplary system environment 100 in which the attention image synthesis system 102 operates. As illustrated in FIG. 1, the system environment 100 includes a server(s) 106, a digital media system 104, attention retention loss 114, attention segregation loss 116, a network 108, a client device 110, and a client application 112.

Although the system environment 100 of FIG. 1 is depicted as having a particular number of components, the system environment 100 is capable of having a different number of additional or alternative components (e.g., a different number of servers, client devices, or other components in communication with the attention image synthesis system 102 via the network 108). Similarly, although FIG. 1 illustrates a particular arrangement of the server(s) 106, the network 108, and the client device 110, various additional arrangements are possible.

The server(s) 106, the network 108, and the client device 110 are communicatively coupled with each other either directly or indirectly (e.g., through the network 108 discussed in greater detail below in relation to FIG. 13). Moreover, the server(s) 106 and the client device 110 include one or more of a variety of computing devices (including one or more computing devices as discussed in greater detail in relation to FIG. 13).

As mentioned above, the system environment 100 includes the server(s) 106. In one or more embodiments, the server(s) 106 processes text queries from a user of the client application 112 to generate a text conditioned image. In one or more embodiments, the server(s) 106 comprises a data server. In some implementations, the server(s) 106 comprises a communication server or a web-hosting server.

In one or more embodiments, the client device 110 includes a computing device that is able to generate and/or provide, for display, a text-conditioned image on the client application 112. For example, the client device 110 includes smartphones, tablets, desktop computers, laptop computers, head-mounted-display devices, or other electronic devices. The client device 110 includes one or more applications (e.g., an image generation application) for processing text queries (e.g., prompts) in accordance with the digital media system 104. For example, in one or more embodiments, the client application 112 works in tandem with the attention image synthesis system 102 to process text queries utilizing a diffusion neural network to generate text-conditioned images. In particular, the client application 112 includes a software application installed on the client device 110. Additionally, or alternatively, the client application 112 of the client device 110 includes a software application hosted on the server(s) 106 which may be accessed by the client device 110 through another application, such as a web browser.

To provide an example implementation, in some embodiments, the attention image synthesis system 102 on the server(s) 106 supports the attention image synthesis system 102 on the client device 110. For instance, in some cases, the digital media system 104 on the server(s) 106 gathers data for the attention image synthesis system 102. In response, the attention image synthesis system 102, via the server(s) 106, provides the information to the client device 110. In other words, the client device 110 obtains (e.g., downloads) the attention image synthesis system 102 from the server(s) 106. Once downloaded, the attention image synthesis system 102 on the client device 110 trains (and utilizes) a diffusion neural network with the attention retention loss 114 and the attention segregation loss 116.

In alternative implementations, the attention image synthesis system 102 includes a web hosting application that allows the client device 110 to interact with content and services hosted on the server(s) 106. To illustrate, in one or more implementations, the client device 110 accesses a software application supported by the server(s) 106. In response, the attention image synthesis system 102 on the server(s) 106, trains a diffusion neural network and generates text-conditioned images at inference time using the attention retention loss 114 and the attention segregation loss 116. The server(s) 106 then provides the text conditioned image to the client device 110 for display.

To illustrate, in some cases, the attention image synthesis system 102 on the client device 110 receives a text query that includes multiple concepts. The client device 110 transmits the text query with the multiple concepts to the server(s) 106. In response, the attention image synthesis system 102 on the server(s) 106 utilizes a diffusion neural network to a text-conditioned image.

Indeed, in some embodiments, the attention image synthesis system 102 is implemented in whole, or in part, by the individual elements of the system environment 100. For instance, although FIG. 1 illustrates the attention image synthesis system 102 implemented or hosted on the server(s) 106, different components of the attention image synthesis system 102 are able to be implemented by a variety of devices within the system environment 100. For example, one or more (or all) components of the attention image synthesis system 102 are implemented by a different computing device (e.g., the client device 110) or a separate server from the server(s) 106. Indeed, as shown in FIG. 1, the client device 110 includes the attention image synthesis system 102. Example components of the attention image synthesis system 102 will be described below with regard to FIG. 11.

Figure 2:
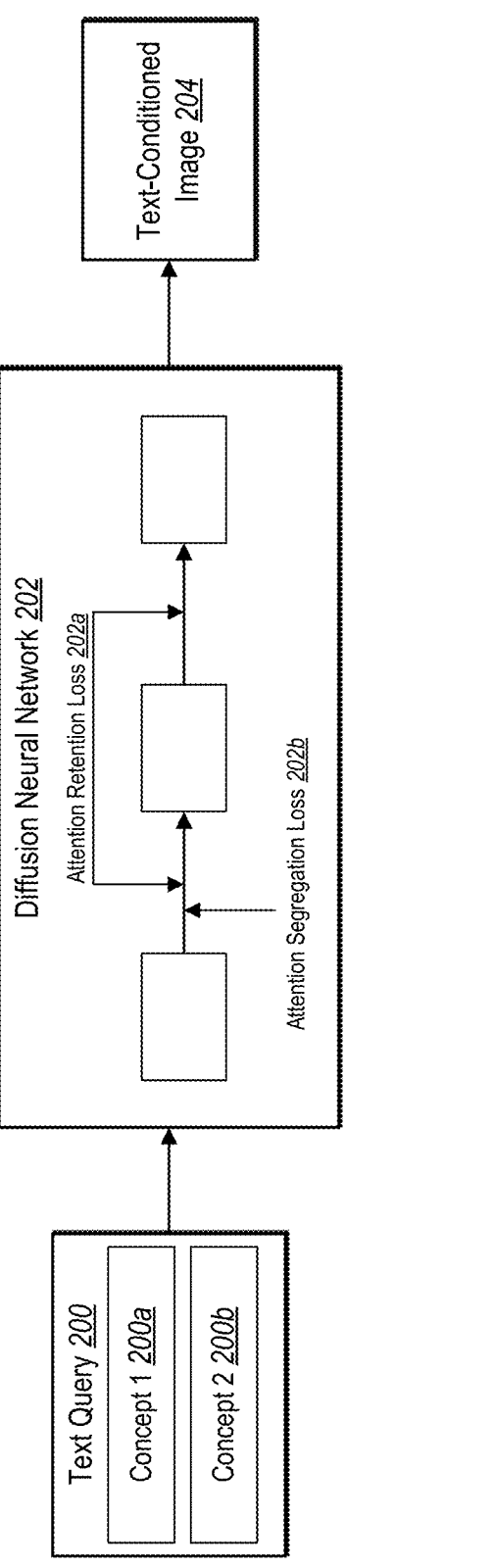
FIG. 2 illustrates an overview of the attention image synthesis system implementing an attention retention loss and an attention segregation loss to generate a text-conditioned image in accordance with one or more embodiments.

As mentioned above, in certain embodiments, the attention image synthesis system 102 generates a text-conditioned image from a text query containing multiple concepts. FIG. 2 illustrates an overview of the attention image synthesis system 102 generating a text-conditioned image utilizing a diffusion neural network in accordance with one or more embodiments.

For example, FIG. 2 shows the attention image synthesis system 102 processing a text query 200. In particular, FIG. 2 shows the text query 200 includes a first concept 200*a* and a second concept 200*b*. In one or more embodiments, the attention image synthesis system 102 receives the text query 200 from a client device utilizing a client application. Further, as mentioned, the text query 200 includes multiple concepts (e.g., the first concept 200*a* and the second concept 200*b*). Specifically, the text query 200 with multiple concepts indicates to the attention image synthesis system 102 to generate an image that includes the first concept 200*a* and the second concept 200*b*. To illustrate, the text query 200 can include "a dog on the beach with an umbrella." In other words, the text query 200 includes a text prompt (e.g., a specific input/instruction) to instruct a machine learning model to perform a task (e.g., generate a text-conditioned image based on the text query 200).

As just mentioned, the text query 200 includes multiple concepts (e.g., a first concept 200*a* and a second concept 200*b*). For instance, a concept includes an idea that represents a category or class. Further, the concept includes a category or class to group together similar objects, events, or ideas. To illustrate, for the text query 200 "a dog on the beach with an umbrella," this text query includes the concepts of "a dog," "a beach," and "an umbrella."

In one or more embodiments, the attention image synthesis system 102 utilizes machine learning to process the text query 200. For example, a machine learning model includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

Similarly, a neural network includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a graph neural network, a diffusion neural network, or a multi-layer perceptron. In some embodiments, a neural network includes a combination of neural networks or neural network components.

FIG. 2 shows the attention image synthesis system 102 utilizing a diffusion neural network 202. In particular, during training of the diffusion neural network 202, a diffusion neural network receives as input a digital image and adds noise to the digital image through a series of steps. For instance, the attention image synthesis system 102 via the diffusion neural network 202 maps a digital image to a latent space utilizing a fixed Markov chain that adds noise to the data of the digital image. Furthermore, each step of the fixed Markov chain relies upon the previous step. Specifically, at each step, the fixed Markov chain adds Gaussian noise with variance which produces a diffusion representation (e.g., diffusion latent vector, a diffusion noise map, or a diffusion inversion). The attention image synthesis system 102 can adjust the number of diffusion layers in the diffusion process (and the number of corresponding denoising layers in the denoising process). In contrast, during inference, the attention image synthesis system 102 introduces a noise vector (e.g., a noise representation) along with the text query 200. In particular, the attention image synthesis system 102 utilizes denoising neural networks of the diffusion neural network 202 to denoise the noise vector conditioned on the text query 200 to generate a text-conditioned image 204. Additional details regarding training of the diffusion neural network 202 is provided below in the description of FIG. 3 and additional details regarding inference of the diffusion neural network 202 is provided in the description of FIGS. 4-6.

Furthermore, FIG. 2 shows the attention image synthesis system 102 implementing (at inference time) the diffusion neural network 202 to include attention retention loss 202*a* and attention segregation loss 202*b*. In one or more embodiments, the attention image synthesis system 102 determines the attention segregation loss 202*b*. In particular, the attention image synthesis system 102 determines the attention segregation loss between attention maps corresponding to a specific denoising step of the diffusion neural network 202. For instance, the attention image synthesis system 102 generates a first attention map for the first concept 200*a* of the text query 200 and a second attention map for the second concept 200*b* of the text query 200, and compares the first attention map and the second attention map. Based on the comparison, the attention image synthesis system 102 determines the attention segregation loss. Additional details regarding the attention segregation loss 202*b* are provided below in the description of FIGS. 4 and 6.

In one or more embodiments, the attention image synthesis system 102 determines the attention retention loss 202*a*. In particular, the attention image synthesis system 102 determines the attention retention loss 202*a* between different denoising steps of the diffusion neural network 202. For instance, the attention image synthesis system 102 determines the attention retention loss 202*a* between a first denoising step and a second denoising step. For example, the attention image synthesis system 102 generates a first attention map corresponding to the first denoising step and a second attention map corresponding to the second denoising step and compares the first attention map of the first denoising step and the second attention map of the second denoising step to determine the attention retention loss 202*a*.

Specifically, the attention image synthesis system 102 determines a threshold activation region for the first attention map corresponding to the first denoising step and generates a binary mask for the first attention map of the first denoising step. Moreover, the attention image synthesis system 102 compares the binary mask with the second attention map corresponding with the second denoising step to determine the attention retention loss 202a. Additional details regarding the attention retention loss 202a is provided below in the description of FIGS. 5 and 6.

Moreover, FIG. 2 shows the attention image synthesis system 102 via the diffusion neural network 202 utilizing at least one of the attention retention loss 202a and the attention segregation loss 202b to generate the text-conditioned image 204. In one or more embodiments, the text-conditioned image 204 includes the attention image synthesis system 102 generating or modifying a digital image based on the text query 200. For instance, the attention image synthesis system 102 conditions the generation of a digital image with the text query 200. Further, the text-conditioned image 204 distinctly includes multiple concepts from the text query 200. To illustrate, for a text query that includes "a dog on the beach with an umbrella," the text-conditioned image 204 distinctly depicts a dog, a beach, and an umbrella all within the text-conditioned image 204. Additional details regarding the generation of the text-conditioned image 204 is provided below in the description of FIG. 8.

Figure 3:
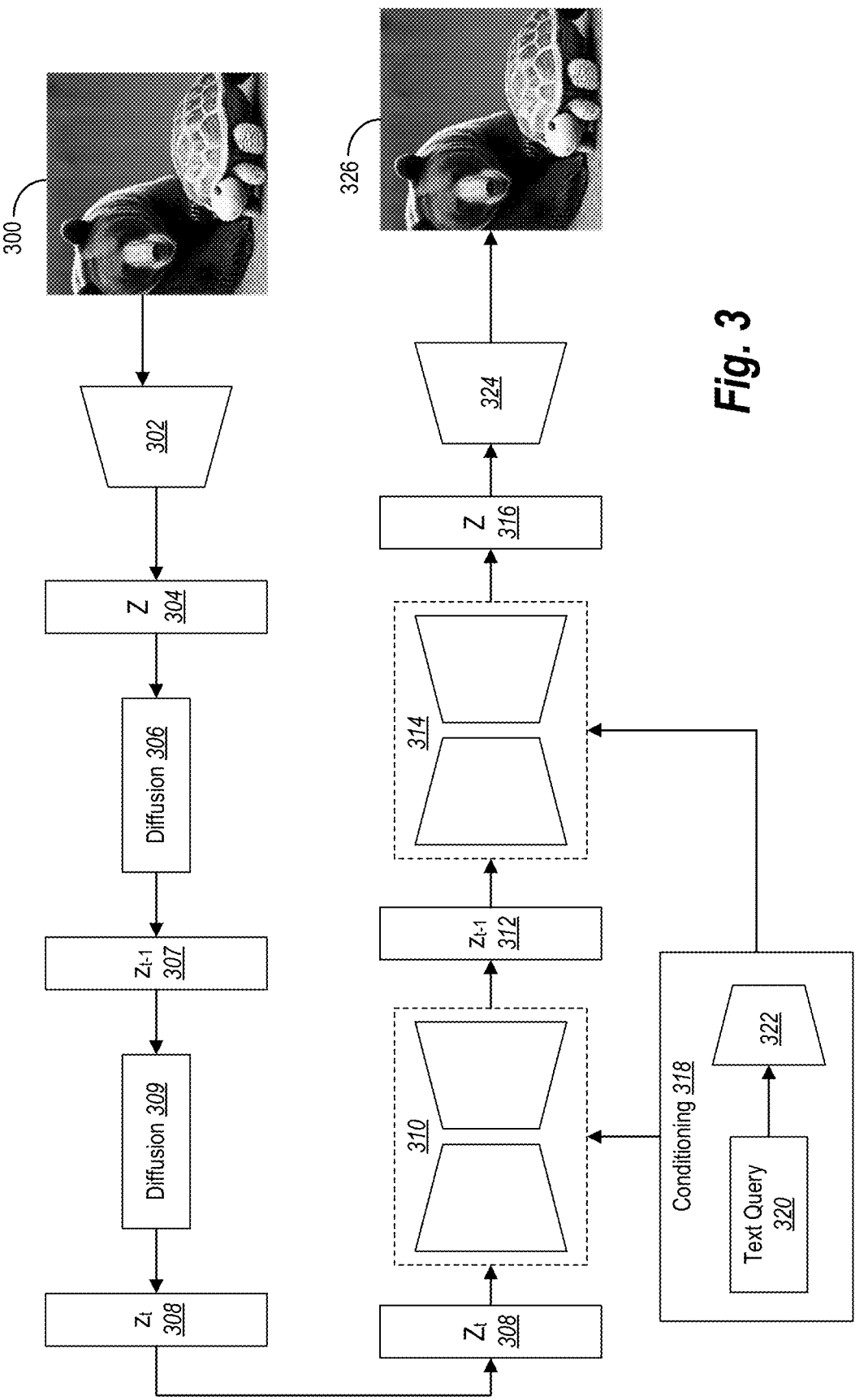
FIG. 3 illustrates a diagram of the attention image synthesis system training a diffusion neural network in accordance with one or more embodiments.

As mentioned above, in certain embodiments, the attention image synthesis system 102 trains a diffusion neural network to generate text-conditioned images. FIG. 3 illustrates the attention image synthesis system 102 training the diffusion neural network to generate text-conditioned images in accordance with one or more embodiments.

As mentioned above, in one or more embodiments, the attention image synthesis system 102 utilizes various types of machine learning models. For example, FIG. 3 illustrates the attention image synthesis system 102 utilizing a diffusion neural network (also referred to as "diffusion probabilistic model" or "denoising diffusion probabilistic model") to generate a text-conditioned image in accordance with one or more embodiments. In particular, FIG. 3 illustrates the diffusion neural network generating a text-conditioned image 326 while the subsequent figures illustrate a denoising portion of the diffusion neural network (e.g., the diffusion neural network at inference time). For example, in one or more embodiments, the attention image synthesis system 102 utilizes a diffusion model (or diffusion neural network) as described by Robin Rombach, Andreas Blattmann, Dominik Lorenz, Patrick Esser, and Bjorn Ommer. High-resolution image synthesis with latent diffusion models. In Proceedings of the IEEE/CVF Conference on Computer Vision and Pattern Recognition, pages 10684-10695, 2022. 1, 2, 3, 4, 5, 7, 8, which are incorporated by reference in their entirety herein.

As mentioned above, the attention image synthesis system 102 utilizes a diffusion neural network. In particular, a diffusion neural network receives as input a digital image 300 and adds noise to the digital image 300 through a series of steps (e.g., diffusion step 306 and diffusion step 309). For instance, the attention image synthesis system 102 via the diffusion neural network diffuses the digital image 300 utilizing a fixed Markov chain that adds noise to the data of the digital image 300. Furthermore, each step of the fixed Markov chain relies upon the previous step. Specifically, at each step (e.g., diffusion step 306 and diffusion step 309), the fixed Markov chain adds Gaussian noise with variance, which produces a diffusion representation (e.g., diffusion latent vector, a diffusion noise map, or a diffusion inversion). Subsequent to adding noise to the digital image 300 at various steps of the diffusion neural network, the attention image synthesis system 102 utilizes a denoising neural network to recover the original data from the digital image 300. Specifically, the attention image synthesis system 102 utilizes steps of a denoising neural network (e.g., denoising neural network step 310 and denoising neural network 314 step) with a length T equal to the length of the fixed Markov chain to reverse the process of the fixed Markov chain.

FIG. 3 illustrates the attention image synthesis system 102 training a diffusion neural network to generate the text-conditioned image 326. In particular, FIG. 3 illustrates the attention image synthesis system 102 analyzing the digital image 300 to generate the text-conditioned image 326 (e.g., a reconstruction of the digital image 300 conditioned on a text query 320). Specifically, the attention image synthesis system 102 utilizes the diffusion process (e.g., diffusion step 306 and diffusion step 309) during training to generate various diffusion representations, culminating in a final diffusion representation that is passed to the denoising neural network 310. The attention image synthesis system 102, during training, supervises the output of each denoising neural network layer based on the diffusion representations generated during the diffusion process.

As illustrated, FIG. 3 shows the attention image synthesis system 102 utilizing an encoder 302 to generate a latent vector 304 (e.g., a diffusion representation) from the digital image 300. In one or more embodiments, the encoder 302 is a neural network (or one or more layers of a neural network) that extract features relating to the digital image 300, e.g., in this instance relating to different concepts depicted within the digital image 300. In some cases, the encoder 302 includes a neural network that encodes features from the digital image 300. For example, the encoder 302 can include a particular number of layers including one or more fully connected and/or partially connected layers that identify and represent characteristics/features of the digital image 300 through a latent feature vector. Thus, the latent vector 304 includes a hidden (e.g., indecipherable to humans) vector representation of the digital image 300. Specifically, the latent vector 304 includes a numerical representation of features of the digital image 300.

Furthermore, FIG. 3 illustrates the diffusion process of the diffusion neural network. In particular, FIG. 3 shows a diffusion of the latent vector 304. At each step (based on the fixed Markov chain) of the diffusion process, the attention image synthesis system 102 via the diffusion neural network generates a diffusion representation. For instance, the diffusion process adds noise to the diffusion representation at each step until the diffusion representation is diffused, destroyed, or replaced. Specifically, the attention image synthesis system 102 via the diffusion process adds Gaussian noise to the signal of the latent vector 304 utilizing a fixed Markov Chain to generate an additional latent vector 307. As shown, the attention image synthesis system 102 further generates a final latent vector 308 (e.g., a final diffusion representation). Moreover, although FIG. 3 illustrates performing the diffusion process with the latent vector 304, in some embodiments, the attention image synthesis system 102 applies the diffusion process to pixels of the digital image (without generating a latent vector representation of the digital image).

As just mentioned, the diffusion process adds noise at each step of the diffusion process. Indeed, at each diffusion step, the diffusion process adds noise and generates a diffusion representation. Thus, for a diffusion process with five diffusion steps, the diffusion process generates five diffusion representations. As shown in FIG. 3 the attention image synthesis system 102 generates the final latent vector 308. In particular, in FIG. 3, the final latent vector 308 comprises random Gaussian noise after the completion of the diffusion process. As part of the diffusion neural network, the denoising neural network denoises the final latent vector 308 (e.g., reverses the process of adding noise to the diffusion representation performed by the diffusion process).

As shown, FIG. 3 illustrates the denoising neural network 310 generating a first denoised representation 312 that partially denoises the final latent vector 308 by generating the first denoised representation 312. Furthermore, FIG. 3 also illustrates the denoising neural network 314 receiving the first denoised representation 312 for further denoising to generate a second denoised representation 316. In particular, in one or more embodiments the number of denoising steps corresponds with the number of diffusion steps (e.g., of the fixed Markov chain).

Moreover, FIG. 3 shows the attention image synthesis system 102 conditioning the denoising neural network 310 and the denoising neural network 314. In particular, FIG. 3 shows the attention image synthesis system 102 performing an act 318 of conditioning the denoising neural networks utilizing a text query 320. For instance, the attention image synthesis system 102 processes the text query 320 with a text encoder 322 to generate a text query embedding. Further, the attention image synthesis system 102 utilizes the text query embedding to condition various layers of the denoising neural networks. Additional details regarding the act 318 of conditioning is given below in the description of FIG. 6.

Furthermore, FIG. 3 illustrates the attention image synthesis system 102 processing the second denoised representation 316 with a decoder 324 to generate the text-conditioned image 326. In one or more implementations, the attention image synthesis system 102 trains the denoising neural networks in a supervised manner based on the diffusion representations generated at the diffusion process. For example, the attention image synthesis system 102 compares (utilizing a loss function) a diffusion representation at a first step of the diffusion process with a final denoised representation generated by the final denoising neural network. Similarly, the attention image synthesis system 102 can compare (utilizing a loss function) a second diffusion representation from a second step of the diffusion process with a penultimate denoised representation generated by a penultimate denoising neural network. The attention image synthesis system 102 can thus utilize corresponding diffusion representations of the diffusion process to teach or train the denoising neural networks to denoise random Gaussian noise and generate digital images conditioned on the text query 320.

In one or more embodiments, the attention image synthesis system 102 implements the diffusion neural network by utilizing a latent diffusion model and cross-attention computation mechanisms. In particular, the implemented latent diffusion model includes an encoder-decoder pair separately trained from the denoising neural networks and diffusion neural networks described above (e.g., a denoising diffusion probabilistic model). Furthermore, the encoder-decoder pair includes a standard variational autoencoder where the attention image synthesis system 102 encodes an image to a latent code to a smaller spatial resolution (e.g., relative to the initial digital image) by utilizing the encoder. Moreover, the attention image synthesis system 102 utilizes the decoder of the encoder-decoder pair, which is trained to reconstruct the digital image. To illustrate, the attention image synthesis system 102 implements the standard variational autoencoder as:

$$I \in R^{w \times H \times 3}$$

Where I indicates an image which is an element of R, a real number which has dimensions of width×height×3. In particular, the above represents an image as a multi-dimensional array. Moreover, the image I is further encoded to a latent code by:

$$z = E(I) \in R^{h \times w \times c}$$

The above equation indicates the latent code z as an output of an encoder E that processes the image I. Furthermore, the latent code z indicates an array or tensor that is an element of a real number(s) that has dimensions of height×width×channels. Furthermore, encoding the image I to a latent code results in a smaller spatial resolution relative to the image I. Additionally, the attention image synthesis system 102 utilizes a decoder to reconstruct the image I:

$$I \approx D(z)$$

Further, in one or more embodiments, the attention image synthesis system 102 operates the denoising neural networks and diffusion neural networks described above utilizing learned latent representations of the autoencoder (mentioned above) in a series of denoising steps. In particular, the attention image synthesis system 102 standardizes the learned latent representations using KL-type losses in a series of denoising steps as described in Diederik P Kingma and Max Welling. Auto-encoding variational bayes. arXiv preprint arXiv:1312.6114, 2013 and Aaron Van Den Oord, Oriol Vinyals, et al. Neural discrete representation learning. Advances in neural information processing systems, 30, 2017, which are both incorporated by reference in their entirety herein.

Moreover, in one or more embodiments during training, the attention image synthesis system 102 given the current latent code $z_t$, utilizes the denoising diffusion probabilistic model to generate $z_{t-1}$. As mentioned above, in one or more embodiments, the attention image synthesis system 102 conditions this denoising process with the output of a text encoder L. The attention image synthesis system 102 utilizing the output of a text encoder are described in Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language supervision. In International conference on machine learning, pages 8748-8763. PMLR, 2021 and Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. The Journal of Machine Learning Research, 21(1):5485-5551, 2020, which are both incorporated in their entirety by reference herein.

Further, in one or more embodiments, the attention image synthesis system 102 given the input of the text query L(p) and using the text encoder L, the attention image synthesis system 102 utilizes the denoising diffusion probabilistic model (DDPM$\epsilon_\theta$), where DDPM is parameterized by theta. Further the attention image synthesis system 102 trains the DDPM to optimize the following loss:

$$E_{z \sim E(I), p, \epsilon \sim N(0,1), t} [\|\epsilon - \epsilon_\theta(z_t, L(p), t)\|] \tag{1}$$

Accordingly, once the attention image synthesis system 102 trains the autoencoder and the DDPM, the attention image synthesis system 102 generates an image by receiving as input the text encoding of the input query L(p), a noisy vector (e.g., a noise representation $z_T\sim N(0, 1)$), running T denoising steps using $\epsilon_\theta$ to obtain $z_0$, and decoding using D to get $I=D(z_o)$.

The attention image synthesis system 102 can utilize a variety of neural network formulations for the denoising neural networks. For example, in some implementations, the attention image synthesis system 102 utilizes a U-Net architecture, as described by High-resolution image synthesis with latent diffusion models, which was mentioned above. In one or more embodiments, the attention image synthesis system 102 implements the diffusion neural network with both self and cross-attention layers as described in Olaf Ronneberger, Philipp Fischer, and Thomas Brox. Unet: Convolutional networks for biomedical image segmentation. In Medical Image Computing and Computer-Assisted Intervention—MICCAI 2015: 18th International Conference, Munich, Germany, Oct. 5-9, 2015, Proceedings, Part III 18, pages 234-241. Springer, 2015, which is incorporated herein by reference in its entirety.

Figure 4:
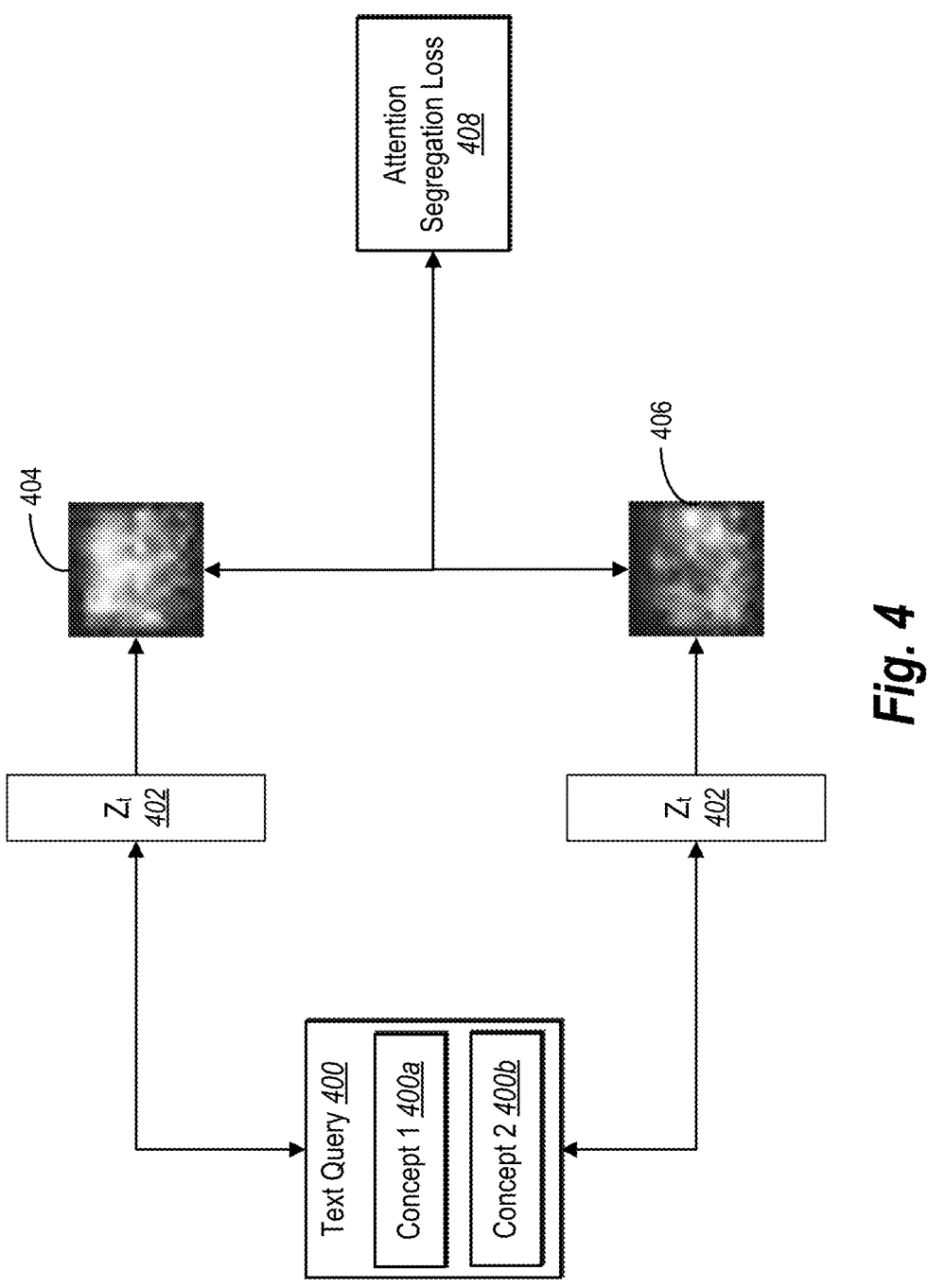
FIG. 4 illustrates a diagram of the attention image synthesis system generating attention maps to further determine an attention segregation loss in accordance with one or more embodiments.

As mentioned above, the attention image synthesis system 102 generates attention maps to further determine an attention segregation loss. FIG. 4 shows the attention image synthesis system 102 implementing attention segregation loss in accordance with one or more embodiments. FIG. 4 illustrates the attention image synthesis system 102 processing a text query 400. Further, as shown, and similar to above, the text query 400 includes a first concept 400a and a second concept 400b.

Moreover, FIG. 4 also show the attention image synthesis system 102 processing a noise representation 402. During implementation of the diffusion neural network, the attention image synthesis system 102 processes the noise representation 402. In one or more embodiments, the noise representation 402 includes the addition of random noise as input data. For instance, the noise representation 402 includes Gaussian noise sampled from a normal distribution with a mean of zero and a specified standard deviation. The attention image synthesis system 102 by utilizing a pre-trained diffusion neural network, processes the noise representation 402 to eventually generate a text-conditioned image.

As mentioned, FIG. 4 shows the attention image synthesis system 102 processing both the text query 400 and the noise representation 402. In particular, FIG. 4 shows the attention image synthesis system 102 performing a comparison between the text query 400 and the noise representation 402. For instance, the attention image synthesis system 102 compares the first concept 400a with the noise representation 402 and also compares the second concept 400b with the noise representation 402. Based on the comparison between the first concept 400a and the noise representation 402, the attention image synthesis system 102 generates a first attention map 404. Moreover, based on the comparison between the second concept 400b and the noise representation 402, the attention image synthesis system 102 generates the second attention map 406.

In one or more embodiments, the attention image synthesis system 102 generates attention maps utilizing cross-attention layers of the diffusion neural network. For instance, the attention image synthesis system 102 utilizes cross-attention layers for explicit text infusion between the text query 400 (e.g., a text query embedding) and the noise representation. Further, the attention image synthesis system

102 generates an attention map at each denoising time step for each token (e.g., concept) within the text query 400 (e.g., input prompt). For example, the attention image synthesis system 102 compares the noise representation with a text query embedding from the text query 400 to determine specific spatial locations for an attention map that corresponds with the first concept 400a or the second concept 400b. Moreover, the attention image synthesis system 102 utilizes attention computational mechanisms to compute attention weights for different spatial locations of the attention map based on the text query embedding.

To illustrate, in some embodiments, the attention image synthesis system 102 implements the methods described in Hila Chefer, Yuval Alaluf, Yael Vinker, Lior Wolf, and Daniel Cohen-Or. Attend-and-excite: Attention-based semantic guidance for text-to-image diffusion models. arXiv preprint arXiv:2301.13826, 2023 and Amir Hertz, Ron Mokady, Jay Tenenbaum, Kfir Aberman, Yael Pritch, and Daniel Cohen-Or. Prompt-to-prompt image editing with cross attention control. arXiv preprint arXiv:2208.01626, 2022, to generate attention maps which are both incorporated by reference herein in their entirety.

As mentioned above, in one or more embodiments the attention image synthesis system 102 generates an attention map from a comparison between the text query 400 and the noise representation 402. In particular, the attention image synthesis system 102 generates an attention map that corresponds with a concept within the text query 400. Further, the attention image synthesis system 102 generates an attention map for a specific concept that also corresponds to a specific denoising step. For instance, the attention map includes a representation that indicates an importance or weight assigned to a region of a digital image for a specific concept. To illustrate, the attention map corresponding to the first concept 400a indicates a high weight (e.g., a high activation threshold) for the first concept 400a relative to the second concept 400b within the text query 400. Whereas the attention map corresponding to the second concept 400b indicates a high weight for the second concept 400b relative to the first concept 400a. Moreover, the attention map indicates to the attention image synthesis system 102 where the diffusion neural network focuses its attention.

Furthermore, as shown in FIG. 4, the attention image synthesis system 102 determines an attention segregation loss 408. In particular, the attention image synthesis system 102 determines the attention segregation loss 408 by comparing the first attention map 404 for the first concept 400a to the second attention map 406 for the second concept 400b. For instance, the attention image synthesis system 102 compares the first attention map 404 and the second attention map 406 to minimize the overlap of the first concept 400a and the second concept 400b within the attention maps. To illustrate, the attention image synthesis system 102 utilizes the attention segregation loss 408 to explicitly causes the denoising process to separate highly activated regions (e.g., threshold activation regions) within the attention maps. Further, by utilizing the attention segregation loss 408, the attention image synthesis system 102 eventually generates a final denoised representation representative of all concepts within the text query 400.

In one or more embodiments, given a pair of concepts within the text query 400 (e.g., the first concept 400a and the second concept 400b), the attention image synthesis system 102 represents the concepts as m, $n \in C$. In particular, m, $n \in C$ indicates that m and n are elements of C, where C represents "concepts." Further, the attention image synthesis system 102 represents an attention map at a specific denoising step for a specific concept as:

$$A_m^t \text{ and } A_n^t.$$

Thus, for time step t, the attention image synthesis system 102 implements the following to determine the attention segregation loss 408:

$$L_{seg} = \sum_{\substack{m,n \in C \\ \forall m > n}} \left[ \frac{\Sigma_{ij} \min\left([A_t^m]_{ij}, [A_t^n]_{ij}\right)}{\Sigma_{ij}\left([A_t^m]_{ij} + [A_t^n]_{ij}\right)} \right] \quad (2)$$

Accordingly, in equation (1), the attention image synthesis system 102 determines the attention segregation loss 408 by determining a summation of the concepts m and n for every instance of m being greater than n. In particular, the attention image synthesis system 102 determines the pixel values (i and j) for $$A_m^t$$

and the pixel values (i and j)

$$A_n^t.$$

Further, as shown in equation (2), the attention image synthesis system 102 sums the minimum values between the pixel values of $$A_m^t$$

and $$A_n^t.$$

The attention image synthesis system 102 then divides the summation of the minimum values between the pixel values of $$A_m^t \text{ and } A_n^t$$

by the summation of the pixel values for $$A_m^t + A_n^t$$

to determine the attention segregation loss 408.

In one or more embodiments, the attention image synthesis system 102 implements an intersection over union (IoU) to determine the attention segregation loss 408. In particular, IoU includes the attention image synthesis system 102 determining the overlap between two regions by determining the ratio of the intersection area to the union area of the regions. For instance, the IoU includes the attention image synthesis system 102 determining the total intersection area between the first concept 400a and the second concept 400b when comparing the first attention map 404 and the second attention map 406. Further, the attention image synthesis system 102 divides the total intersection area by the total union area, which includes the total area covered by the first attention map 404 with the first concept 400a and the second attention map 406 with the second concept 400b. Thus, the determined IoU value indicates a degree of overlap between the first concept 400a and the second concept 400b. Accordingly, the attention image synthesis system 102 reduces the IoU value between the first concept 400a and the second concept 400b to minimize the overlap between the first concept 400a and the second concept 400b. To illustrate, the attention image synthesis system 102 reduces the IoU value by adjusting the position or size of the first concept 400a and/or the second concept 400b.

Although FIG. 4 shows the text query 400 containing two concepts, in one or more embodiments, the attention image synthesis system 102 processes a text query with more than two concepts. For example, the attention image synthesis system 102 processes a text query with three concepts. In particular, the attention image synthesis system 102 applies similar principles discussed above to determine the attention segregation loss 408. For instance, the attention image synthesis system 102 applies equation (2) utilizing three tokens (e.g., for the three concepts) to consider and compute the summation of all variations of the three pairs.

Moreover, although FIG. 4 shows and discusses determining the attention segregation loss 408 for each denoising step, in one or more embodiments, the attention image synthesis system 102 determines the attention segregation loss 408 for some of the denoising steps. In particular, in some embodiments, the attention image synthesis system 102 implements a threshold (e.g., 50% of the denoising steps, 75% of the denoising steps, etc.) to determine the number of denoising steps to determine the attention segregation loss 408. Further, in some embodiments, the attention image synthesis system 102 implements a different threshold depending on the number of denoising steps. To illustrate, if a diffusion neural network includes fifty denoising steps, the attention image synthesis system 102 determines to determine the attention segregation loss 408 for the first twenty-five denoising steps.

Figure 5:
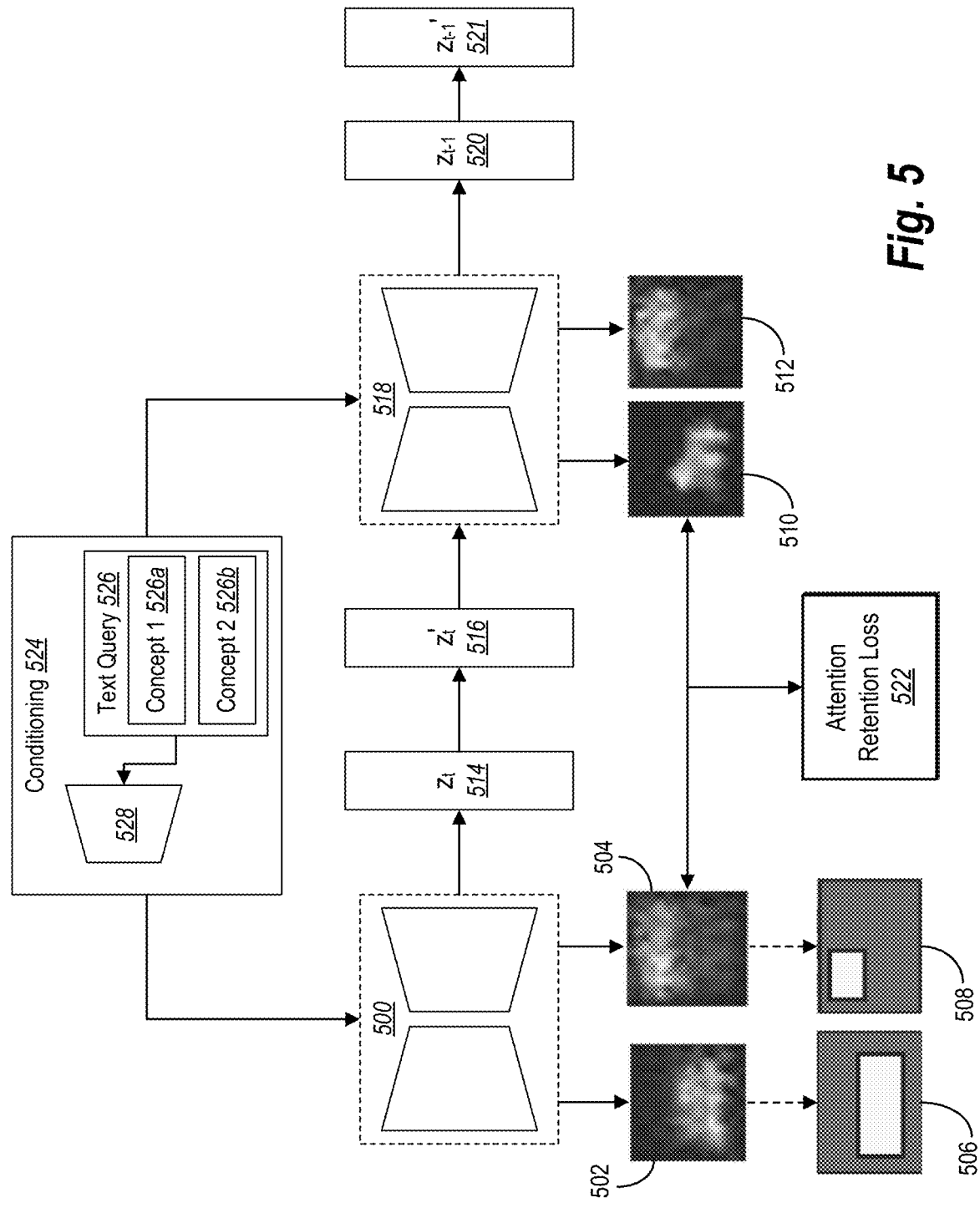
FIG. 5 illustrates a diagram of the attention image synthesis system generating attention maps for different denoising steps to determine an attention retention loss in accordance with one or more embodiments.

As mentioned above, the attention image synthesis system 102 determines an attention retention loss to assist in generating a text-conditioned image with multiple distinct separate concepts. FIG. 5 illustrates, the attention image synthesis system 102 determining an attention retention loss from attention maps in accordance with one or more embodiments. For example, FIG. 5 shows the attention image synthesis system 102 generating a noise representation 514 from denoising neural network 500 and subsequently generating a modified noise representation 516 from the noise representation 514. Furthermore, based on the denoising neural network 518 processing the modified noise representation 516, the attention image synthesis system 102 generates an additional noise representation 520.

Furthermore, FIG. 5 shows the attention image synthesis system 102 generating an additional modified noise representation 521 from the additional noise representation 520. To do so, the attention image synthesis system 102 determines an attention retention loss 522. In particular, the attention image synthesis system 102 determines the attention retention loss 522 between a first denoising step (e.g., corresponding to the denoising neural network 500) and a second denoising step (e.g., corresponding to the denoising neural network 518).

As shown in FIG. 5, the attention image synthesis system 102 generates attention maps corresponding to each denoising step. The generation of attention maps was discussed above in FIG. 4. In FIG. 5, in one or more embodiments, the attention image synthesis system 102 similarly generates attention maps for concepts of a text query 526. In particular, FIG. 5 shows the attention image synthesis system 102 generating a first attention map 502 corresponding to a first concept 526*a* and a second attention map 504 corresponding to a second concept 526*b*. As shown, both the first attention map 502 and the second attention map 504 also correspond to a specific denoising step (e.g., a first denoising step of the denoising neural network 500). Moreover, FIG. 5 shows the attention image synthesis system 102 generating a third attention map 510 corresponding to the first concept 526*a* and a fourth attention map 512 corresponding to the second concept 526*b*. The third attention map 510 and the fourth attention map 512 also correspond to a specific denoising step (e.g., a second denoising step of the denoising neural network 518).

In one or more embodiments, the attention image synthesis system 102 determines the attention retention loss 522 by comparing the attention maps. In particular, the attention image synthesis system 102 compares the first attention map 502 with the third attention map 510 (e.g., a comparison across denoising steps). Further, the attention image synthesis system 102 compares the second attention map 504 with the fourth attention map 512. By comparing attention maps for the same concept across denoising steps, the attention image synthesis system 102 ensures retention of information from previous steps to subsequent steps.

In one or more embodiments, in addition to comparing attention maps, the attention image synthesis system 102 generates a binary mask for comparison. As shown in FIG. 5, the attention image synthesis system 102 optionally generates a first binary mask 506 for the first attention map 502 and a second binary mask 508 for the second attention map 504. In particular, the attention image synthesis system 102 generates the binary masks by determining a threshold activation region for each attention map. For instance, the threshold activation region includes a predetermined amount of activation of the attention map. Specifically, the threshold activation region corresponds with a specific concept of the text query for a specific denoising step.

In one or more embodiments, the attention image synthesis system 102 generates the first binary mask 506 and the second binary mask 508 by utilizing the threshold activation region for an attention map. For instance, the attention image synthesis system 102 segments a portion of the attention map that corresponds with the threshold activation region. Further, the attention image synthesis system 102 generates a binary mask by utilizing a convolutional operation of a segmentation machine learning model to generate a binary mask that indicates the high threshold activation region and a region not corresponding with the high threshold activation region.

Furthermore, FIG. 5 also shows conditioning at each denoising step. For example, FIG. 5 shows the attention image synthesis system 102 performing an act 524 of conditioning the denoising neural network 500 and the denoising neural network 518. In particular, the attention image synthesis system 102 processes the text query 526 with the first concept 526*a* and the second concept 526*b* with a text encoder 528 and conditions the denoising neural networks with a text query embedding. As mentioned earlier, additional details regarding conditioning are given below in FIG. 6.

As mentioned above, the attention image synthesis system 102 utilizes the attention retention loss 522 across denoising steps to retain information pertaining to multiple concepts of the text query 526 within a final denoised representation. In one or more embodiments, given a concept within the text query 526 (e.g., the first concept 526*a*), the attention image synthesis system 102 represents the concept as $m \in C$. In particular, $m \in C$ indicates that m is an element of C, where C represents "concepts." Further, the attention image synthesis system 102 represents an attention map at a specific denoising step for concept m as:

$$A_m^t.$$

Moreover, the attention image synthesis system 102 determines the pixel regions of $$A_m^t$$

that satisfy a threshold activation region (e.g., high activation regions) and binarizes the threshold activation region to obtain its binary mask $$B_m^t.$$

For instance, the attention image synthesis system 102 utilizes $$B_m^t$$

as a ground truth for subsequent denoising steps (e.g., t−1). For example, the attention image synthesis system 102 ensures that $$A_m^{t-1}$$

is consistent with $$B_m^t.$$

Thus, for time step t−1, the attention image synthesis system 102 implements the following to determine the attention retention loss 522:

$$L_{ret} = \sum_{m \in C} \left[ 1 - \frac{\Sigma_{ij} \min([A_{t-1}^m]_{ij}, [B_t^m]_{ij})}{\Sigma_{ij}([A_{t-1}^m]_{ij} + [B_t^m]_{ij})} \right] \qquad (3)$$

Equation (3) shows a summation of m. In particular, the attention image synthesis system 102 determines the minimum of pixel values i and j between $$A_m^{t-1} \text{ and } B_m^t.$$

Further, the attention image synthesis system 102 determines the summation of the minimum pixel values between $$A_m^{t-1} \text{ and } B_m^t$$

and divides the summation of the minimum pixel values by the summation of $$[A_{t-1}^m]_{ij} + [B_t^m]_{ij}.$$

Moreover, the attention image synthesis system 102 determines 1 subtract the summation of the minimum pixel values by the summation of $$[A_{t-1}^m]_{ij} + [B_t^m]_{ij}$$

to determine the attention retention loss 522.

In one or more embodiments, the attention image synthesis system 102 implements an intersection over union (IoU) to determine the attention retention loss 522 (e.g., similar to implementing the IoU as discussed in FIG. 4). In particular, as a reminder, IoU includes the attention image synthesis system 102 determining the overlap between two regions by determining the ratio of the intersection area to the union area of the regions. For instance, the attention image synthesis system 102 maximizes the IoU value between $$A_m^{t-1} \text{ and } B_m^t.$$

To illustrate, the attention image synthesis system 102 maximizes the IoU value by adjusting the position or size of $$A_m^{t-1}$$

in accordance with $$B_m^t.$$

Figure 6:
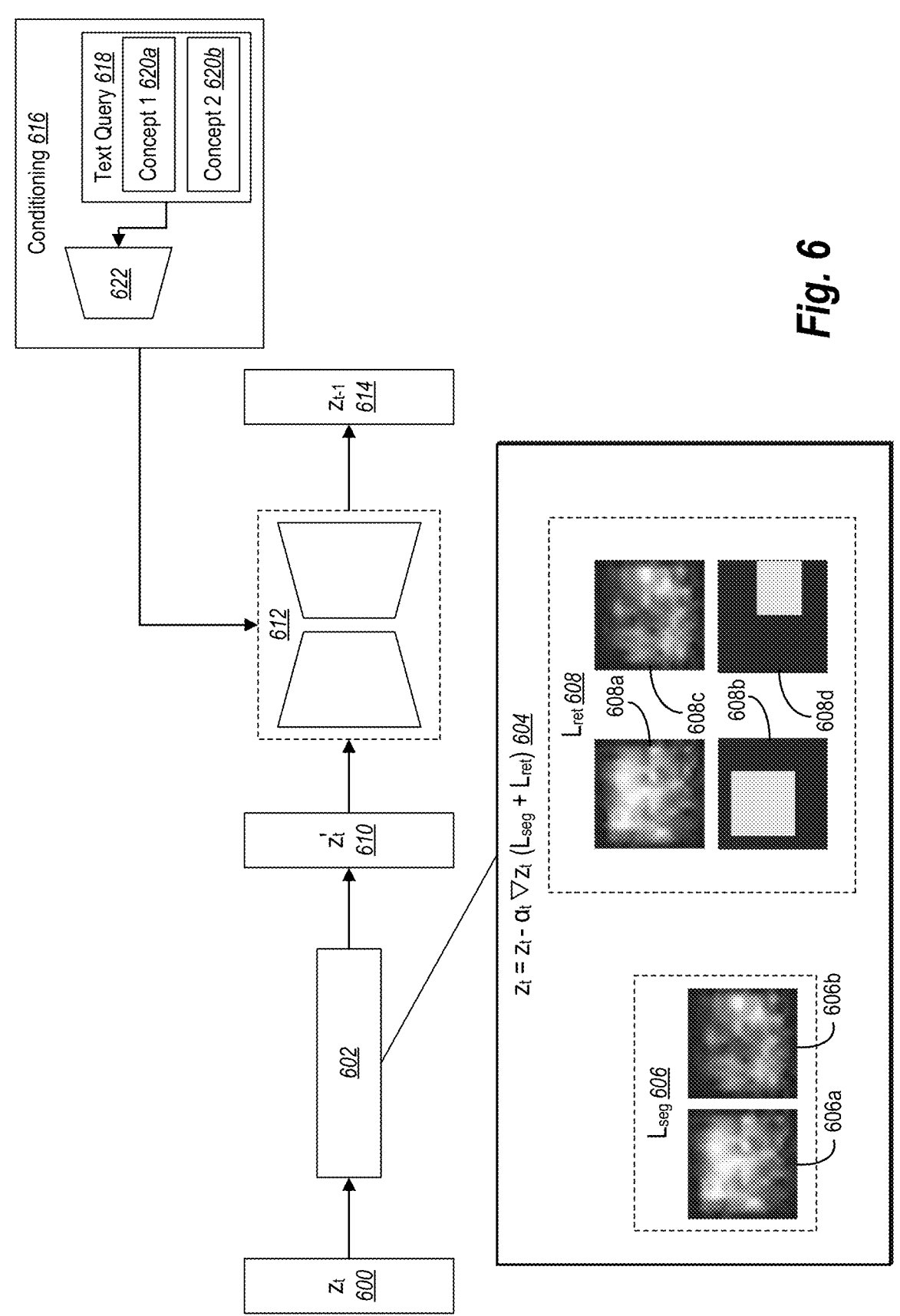
FIG. 6 illustrates a diagram of the attention image synthesis system implementing attention segregation loss and attention retention loss in accordance with one or more embodiments.

FIGS. 4-5 describe the attention image synthesis system 102 implementing one of the attention segregation loss or the attention retention loss. FIG. 6 illustrates the attention image synthesis system 102 implementing both the attention segregation loss and the attention retention loss in accordance with one or more embodiments. For example, FIG. 6 shows the attention image synthesis system 102 processing a noise representation 600 which was discussed above. In particular, FIG. 6 shows the attention image synthesis system 102 performing an act 602 in response to processing the noise representation 600. For instance, the act 602 includes the attention image synthesis system 102 determining a combined loss 604.

In one or more embodiments, the combined loss 604 includes a determined attention segregation loss and a determined attention retention loss. In particular, similar to the discussion in FIG. 4, the attention image synthesis system 102 determines an attention segregation loss 606 from a first attention map 606a of a first concept and a second attention map 606b of a second concept. Moreover, as discussed in FIG. 5, the attention image synthesis system 102 determines an attention retention loss 608 from comparing a first attention map corresponding to a second denoising step 608a with a first binary mask corresponding to a first denoising step 608b and comparing a second attention map corresponding to a second denoising step 608c with a second binary mask corresponding to a first denoising step 608d.

In one or more embodiments, the combined loss 604 includes the attention image synthesis system 102 combining the attention segregation loss 606 and the attention retention loss 608 to optimize a latent diffusion model. Further, the attention image synthesis system 102 generates the combined loss 604 utilizing an overall loss function to direct the noise representation 600 in a direction as measured by the combined loss 604 (e.g., modify the noise representation 600). For instance, the attention image synthesis system 102 utilizes the combined loss 604 to generate a modified noise representation 610 according to both the attention segregation loss 606 and the attention retention loss 608. To illustrate, the attention image synthesis system 102 represents the combined loss 604 as:

$$L = L_{seg} + L_{ret} \tag{4}$$

For example, equation (4) includes the attention image synthesis system 102 directing the noise representation 600 in a direction based on the combined loss 604 in concordance with a specific denoising step (e.g., a time step).

For instance, the attention image synthesis system 102 utilizes the following to generate the modified noise representation 610:

$$z_t' = z_t - \alpha_t \cdot \nabla_{z_t}^L$$

In particular, generating the modified noise representation 610 includes the attention image synthesis system 102 integrating at which indicates an adaptive step size. An adaptive step size includes a scalar value (e.g., a value that indicates a single component such as magnitude) which modifies a noise representation of the denoising neural network at a specific denoising step. The adaptive step size varies at different steps of the denoising process. The attention image synthesis system 102 optimizes the generation of text-conditioned images by utilizing adaptive step sizes. Further, as shown, the attention image synthesis system 102 multiplies the adaptive step size with a gradient of the loss and the specific time step. In particular, the attention image synthesis system 102 utilizes the gradient operation to determine a direction and magnitude of the steepest ascent or descent of the combined loss 604. For instance, the attention image synthesis system 102 applies the gradient operation through backpropagation to update the noise representation. Accordingly, the determined gradient operation indicates a direction in which to modify the noise representation 610.

Further, FIG. 6 shows the modified noise representation 610 generated from the act 602 of determining the combined loss 604. In one or more embodiments, the attention image synthesis system 102 generates the modified noise representation 610 form the noise representation 600. In particular, the attention image synthesis system 102 generates the modified noise representation 610 based on at least one of the attention segregation loss 606 and/or the attention retention loss 608. As shown in FIG. 6, the attention image synthesis system 102 generates the modified noise representation 610 from both the attention segregation loss 606 and the attention retention loss 608. Further, the attention image synthesis system 102 utilizes the modified noise representation 610 in subsequent denoising steps.

FIG. 6 shows the attention image synthesis system 102 generating an additional noise representation 614 with the denoising neural network 612 based on the modified noise representation 610. Further, as shown, the attention image synthesis system 102 generates the additional noise representation 614 by performing an act 616 of conditioning. Specifically, the attention image synthesis system 102 conditions the denoising neural network 612 to generate the additional noise representation 614.

To illustrate, in one or more embodiments, conditioning layers of a neural network includes providing context to the networks to guide the generation of the subsequent noise representations and eventually a text-conditioned image. For instance, conditioning layers of neural networks include at least one of (1) transforming conditioning inputs (e.g., the text query) into vectors to combine with the denoising representations; and/or (2) utilizing attention mechanisms which causes the neural networks to focus on specific portions of the input and condition its predictions (e.g., outputs) based on the attention mechanisms. Specifically, for denoising neural networks, conditioning layers of the denoising neural networks includes providing an alternative input to the denoising neural networks (e.g., the text query). In particular, the attention image synthesis system 102 provides alternative inputs to provide a guide in removing noise from the diffusion representation (e.g., the denoising process). Thus, the attention image synthesis system 102 conditioning layers of the denoising neural networks acts as guardrails to allow the denoising neural networks to learn how to remove noise from an input signal and produce a clean output.

Specifically, conditioning the layers of the network includes modifying input into the layers of the denoising neural networks to combine with the modified noise representation 610. For instance, the attention image synthesis system 102 combines (e.g., concatenates) vector values generated from the encoder at different layers of the denoising neural networks. For instance, the attention image synthesis system 102 combines one or more conditioning vectors with the modified noise representation 610.

Moreover, FIG. 6 shows that the act 616 of conditioning includes the attention image synthesis system 102 processing a text query 618. In particular, the text query 618 includes a first concept 620*a* and a second concept 620*b*. For instance, the attention image synthesis system 102 processes the text query 618 with a text encoder 622. In particular, the text encoder includes a component of a neural network to transform textual data (e.g., the text query) into a numerical representation. For instance, the disclosed system utilizes the text encoder 622 to transform the text query 618 into a text vector representation. Further, the attention image synthesis system 102 utilizes the text encoder 622 in a variety of ways. For instance, the attention image synthesis system

102 utilizes the text encoder 622 to i) determine the frequency of individual words in the text query 618 (e.g., each word becomes a feature vector), ii) determines a weight for each word within the text query 618 to generate a text vector that captures the importance of words within a text query, iii) generates low-dimensional text vectors in a continuous vector space that represents words within the text query 618, and/or iv) generates contextualized text vectors by determining semantic relationships between words within the text query 618.

Further, the attention image synthesis system 102 utilizes the text encoder 622 to generate a text vector representation. In one or more embodiments, the text vector representation includes a numeral representation of the text query 618. In particular, the attention image synthesis system 102 generates the text vector representation via a text encoding process and the text vector representation indicates various aspects of the text query 618. For instance, the text vector representation indicates the presence of specific concepts, the meaning of the specific concepts, the relationship between concepts, and the context of the concepts. As shown, based on the act 616 of conditioning and the modified noise representation 610, the attention image synthesis system 102 generates an additional noise representation 614. Thus, the denoising process considers the modified noise representation 610 and the text vector representation (e.g., the text query) to generate text-conditioned images.

Although FIG. 6 shows the attention image synthesis system 102 utilizing the combined loss 604 that includes the attention segregation loss 606 and the attention retention loss 608, in one or more embodiments, the attention image synthesis system 102 utilizes a combined loss that includes the attention segregation loss 606, the attention retention loss 608, and other loss functions. In particular, the other loss functions include loss functions discussed in High-resolution image which was mentioned earlier. Moreover, in some implementations, the attention image synthesis system directs the noise representation 600 based on an attention retention loss or an attention segregation loss (e.g., without generating the combined loss 604).

As mentioned above, the attention image synthesis system 102 utilizes the attention segregation loss and the attention retention loss to generate attention maps that distinctly segregate different concepts and retains information relating to different concepts across the denoising process. FIG. 7 illustrates a comparison between attention maps across various denoising steps for an example implementation the attention image synthesis system 102 and prior systems in accordance with one or more embodiments. For example, FIG. 7 shows the attention maps for the concepts of dog, beach, and umbrella across multiple denoising steps. In particular, the attention maps for the concepts of dog, beach, and umbrella are based on an example implementation of the attention image synthesis system 102 processing a text query 700 that includes "a dog on a beach with an umbrella."

As shown, FIG. 7 illustrates prior methods for dog 702 versus the attention image synthesis system 102 for dog. In particular, the prior methods for dog 702 shows an attention map for dog 702*a* with a highly activated region for dog comparable to an attention map for dog 702*b* of the attention image synthesis system 102. Likewise for prior methods for beach 704 compared to the attention image synthesis system 102 for beach, a first attention map for beach 704*a* also includes a high activation region comparable to an attention map for beach 704*b*. Additionally, for prior methods for umbrella 706 compared to the attention image synthesis system 102 for umbrella, a first attention map for umbrella 706a includes a high activation region comparable to an attention map for umbrella 706b. However, despite comparable activation regions for the first attention map shown for the prior methods versus the attention image synthesis system 102, subsequent attention maps for the prior methods show a decay in quality. Namely, the prior methods fail to retain the activation of the various concepts (e.g., dog, beach, and umbrella) during the later denoising steps. For instance, a last attention map for dog 702c, a last attention map for beach 704c, and a last attention map for umbrella 706c compared to the attention image synthesis system 102 (e.g., attention map 702d, 704d, and 706d) shows very sparse activation for the prior methods and a failure to retain information across the denoising process. For example, the last attention map for umbrella 706c shows activation spread out in various locations unlike the attention map 706d which shows the activation pixels concentrated in a specific region. Thus, FIG. 7 illustrates the attention image synthesis system 102 outperforming prior methods in retaining information across denoising steps for multiple concepts.

Figure 8:
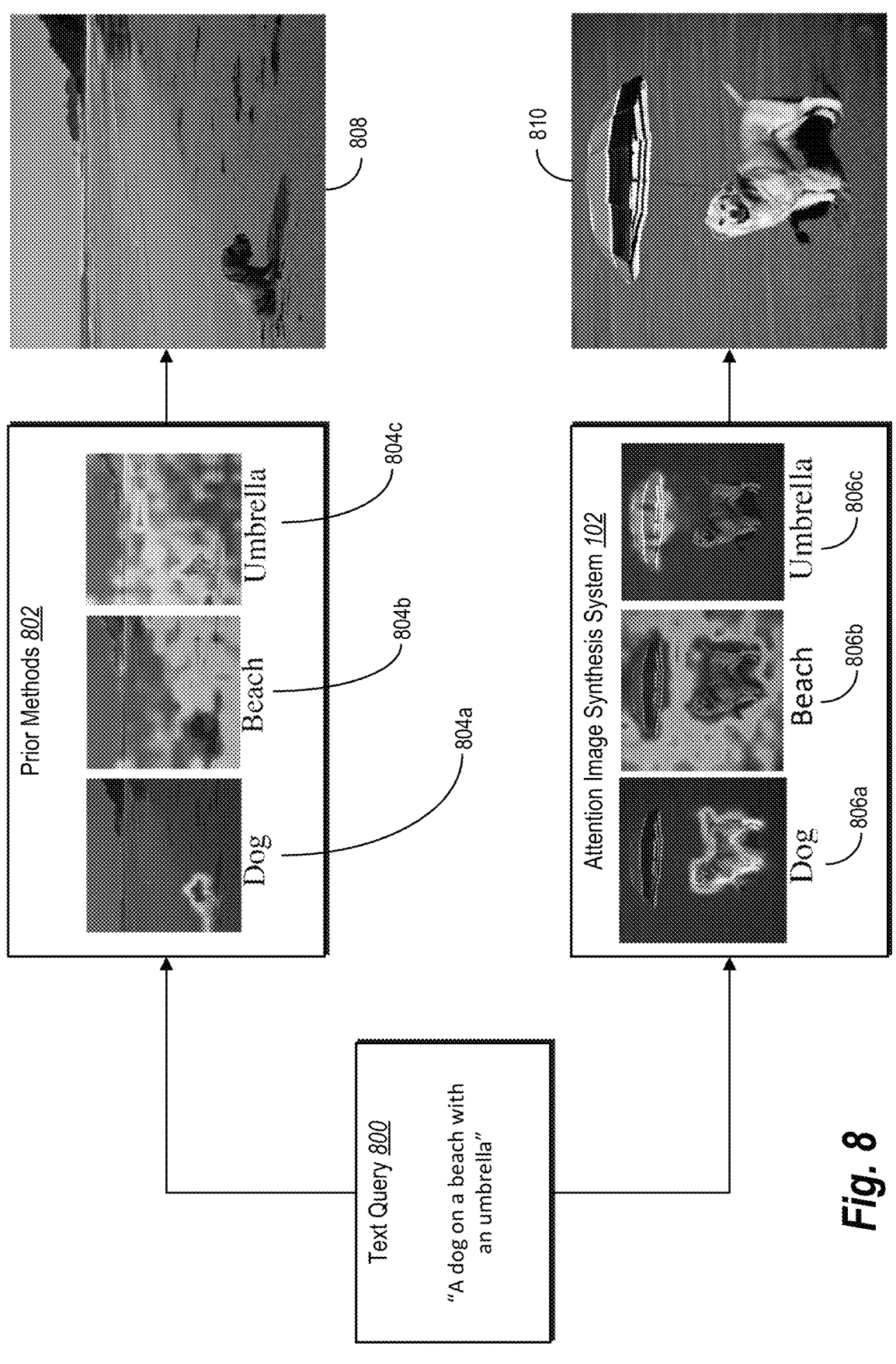
FIG. 8 illustrates example results of text-conditioned images between the attention image synthesis system and prior methods in accordance with one or more embodiments.

As mentioned, FIG. 7 illustrates the attention image synthesis system 102 generating multiple attention maps corresponding to various denoising steps. FIG. 8 illustrates final attention maps generated by averaging the attention maps across each denoising step to generate a final output (e.g., a text-conditioned image) in accordance with one or more embodiments. For example, FIG. 8 shows an example implementation of the attention image synthesis system 102 processing a text query 800 that includes "a dog on a beach with an umbrella." Further, FIG. 8 shows the attention maps for prior methods 802 as well as the attention image synthesis system 102 as well as a final attention map for each concept.

As shown in FIG. 8, the prior methods 802 show an average dog attention map 804a, an average beach attention map 804b, and an average umbrella attention map 804c. In particular, the prior methods 802 utilizes each of the attention maps (e.g., across the denoising process) for each concept and generates an average attention map that accounts for each activated region in each attention map. Furthermore, FIG. 8 shows the prior methods 802 generating a text-conditioned image 808 based on the average dog attention map 804a, the average beach attention map 804b, and the average umbrella attention map 804c. As shown in the text-conditioned image 808, the text-conditioned image 808 shows a beach and a dog but fails to show an umbrella.

Moreover, FIG. 8 shows the attention image synthesis system 102 generating final attention maps. In particular, FIG. 8 shows for the attention image synthesis system 102 an average dog attention map 806a, an average beach attention map 806b, and an average umbrella attention map 806c. For instance, the attention image synthesis system 102 also generates the average attention maps based on accounting for each activated region in each attention map (e.g., across the denoising process) shown in FIG. 7. Further, FIG. 8 shows the attention image synthesis system 102 generating a text-conditioned image 810 based on the average dog attention map 806a, the average beach attention map 806b, and the average umbrella attention map 806c. As shown, unlike the text-conditioned image 808, the text-conditioned image 810 shows the dog, the umbrella, and the beach.

Figure 9:
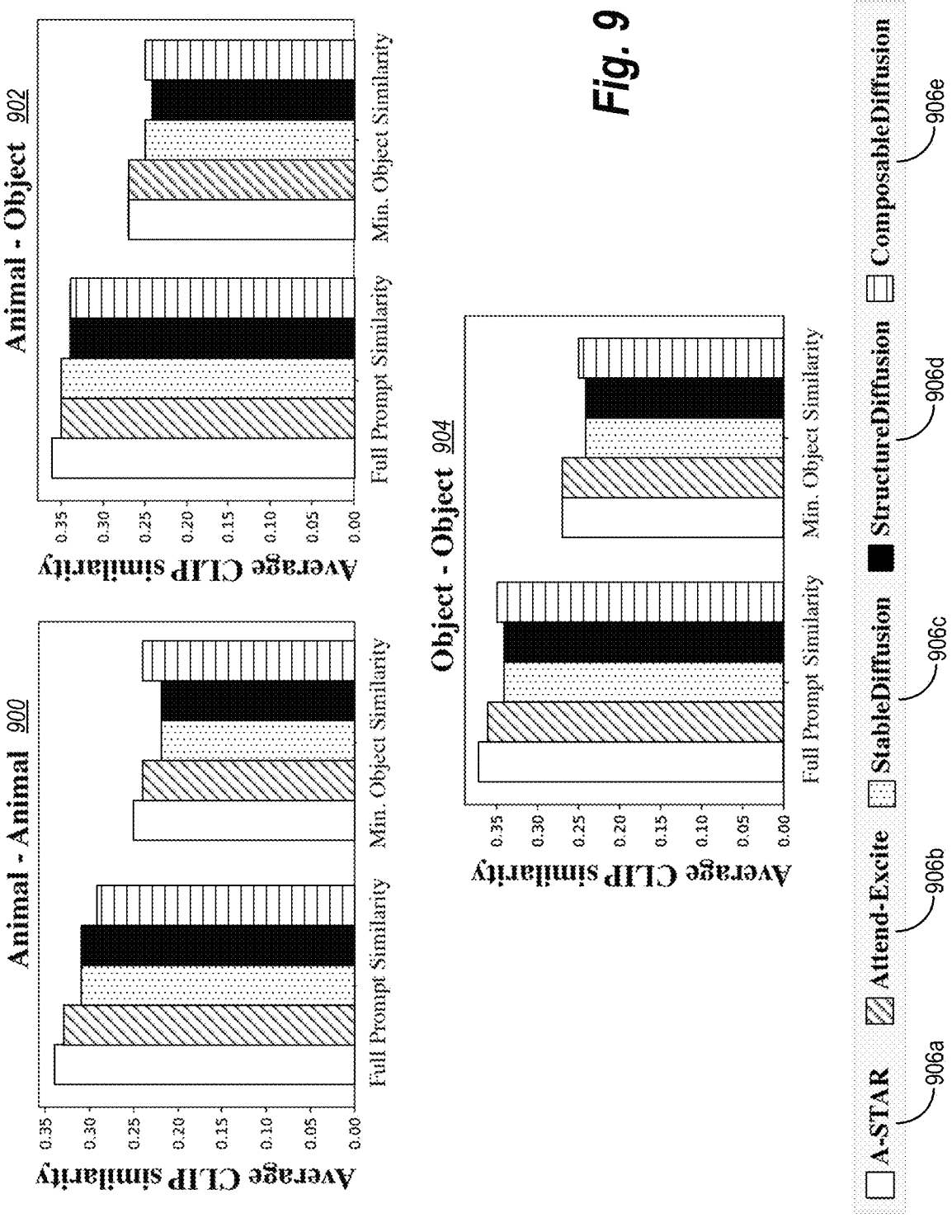
FIG. 9 illustrates example experimental results for image-text similarities of the attention image synthesis system compared with other systems in accordance with one or more embodiments.

FIG. 9 illustrates experimental results for an example implementation of the attention image synthesis system 102 as compared to prior systems. For example, FIG. 9 illustrates contrastive language-image pretraining (e.g., CLIP) image-text similarities between text prompts and images generated by various methods. For instance, experimenters implemented the methods for CLIP described in Hila Chefer, Yuval Alaluf, Yael Vinker, Lior Wolf, and Daniel Cohen-Or. Attend-and-excite: Attention-based semantic guidance for text-to-image diffusion models. arXiv preprint arXiv: 2301.13826, 2023, and Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language supervision. In International conference on machine learning, pages 8748-8763. PMLR, 2021.

In particular, for FIG. 9, experimenters generated 64 images with randomly selected seeds (e.g., concepts) and computed the average image-text cosine similarity using CLIP for each prompt (e.g., text query). For instance, CLIP determines a relationship between images and their associated textual descriptions. Further, for FIG. 9, a high CLIP similarity score indicates a high degree of similarity between prompt and generated image. As shown in FIG. 9 experimenters determine the average CLIP similarity for animal-animal 900, animal-object 902, and object-object 904. For each graph, the experimenters utilize both full prompt similarity and minimum object similarity. For instance, full prompt similarity includes determining a cosine similarity between a full prompt and a generated image and minimum object similarity includes determining a minimum of two similarities between a generated image and each of the two subject prompts.

Thus, for animal-animal 900, FIG. 9 shows for the attention image synthesis system 102 (indicated as A-STAR 906a) has the highest average CLIP similarity as compared to prior methods (e.g., attend-excite 906b, StableDiffusion 906c, StructureDiffusion 906d, and ComposableDiffusion 906e). Likewise, the attention image synthesis system 102 (also indicated as A-STAR 906a) has the highest average CLIP similarity score compared to prior methods for animal-object 902, and object-object 904. Accordingly, FIG. 9 illustrates that the attention image synthesis system 102 outperforms prior methods in generating text-conditioned images in terms of the similarity between a generated image and an associated text query (e.g., text prompt).

FIG. 10 illustrates text-text similarities and subsequent ablation studies in accordance with one or more embodiments. For example, chart 1000 illustrates text-text similarities between text prompts and BLIP-generated captions (e.g., bootstrapping language-image pre-training) for generated images. In particular, for BLIP, experimenters implemented the methods described in Junnan Li, Dongxu Li, Caiming Xiong, and Steven Hoi. Blip: Bootstrapping language-image pre-training for unified vision-language understanding and generation. In International Conference on Machine Learning, pages 12888-12900. PMLR, 2022.

As shown in FIG. 10, experimenters generated captions for generated images with BLIP and compares the BLIP-generated captions with the text prompts (e.g., a ground truth). In particular, FIG. 10 shows a comparison between an example implementation of the attention image synthesis system 102 and prior methods. For each animal-animal, animal-object, and object-object, the attention image synthesis system 102 (indicated as A-STAR) shows improvement over prior methods in terms of text-text similarities. Namely, the attention image synthesis system 102 (A-STAR) shows a text-text similarity of 0.82, 0.84, and 0.82 which is at least 0.01 greater than the best results for prior methods.

Furthermore, FIG. 10 shows a chart 1002 that illustrates an ablation study of the attention image synthesis system 102. For example, FIG. 10 shows the text-text similarities for prior methods and the attention image synthesis system 102 with different losses implemented. In particular, FIG. 10 shows stable 1002*a* (e.g., a prior method) with an animal-animal text-text similarity of 0.76, an animal-object text-text similarity of 0.78, and an object-object text-text similarity of 0.77. Further, stable+attention retention loss 1002*b* shows an improvement of the attention image synthesis system 102 over stable 1002 (the prior method) of 0.78 for animal-animal, 0.83 for animal-object, and 0.79 for object-object. For stable+attention segregation loss 1002*c*, the attention image synthesis system 102 shows an improvement over stable 1002 (e.g., the prior method) of 0.79 for animal-animal, 0.82 for animal-object, and 0.80 for object-object. Moreover, for stable+attention retention loss+attention segregation loss 1002*d*, the attention image synthesis system 102 shows an improvement over all prior implementations of 0.82 for animal-animal, 0.84 for animal-object, and 0.82 for object-object. Thus, FIG. 10 illustrates that the attention image synthesis system 102 implementing at least one of attention segregation loss or attention retention loss results in improvements over prior methods. Further, the attention image synthesis system 102 implementing both the attention segregation loss and the attention retention loss results in significant improvements over prior methods.

Figure 11:
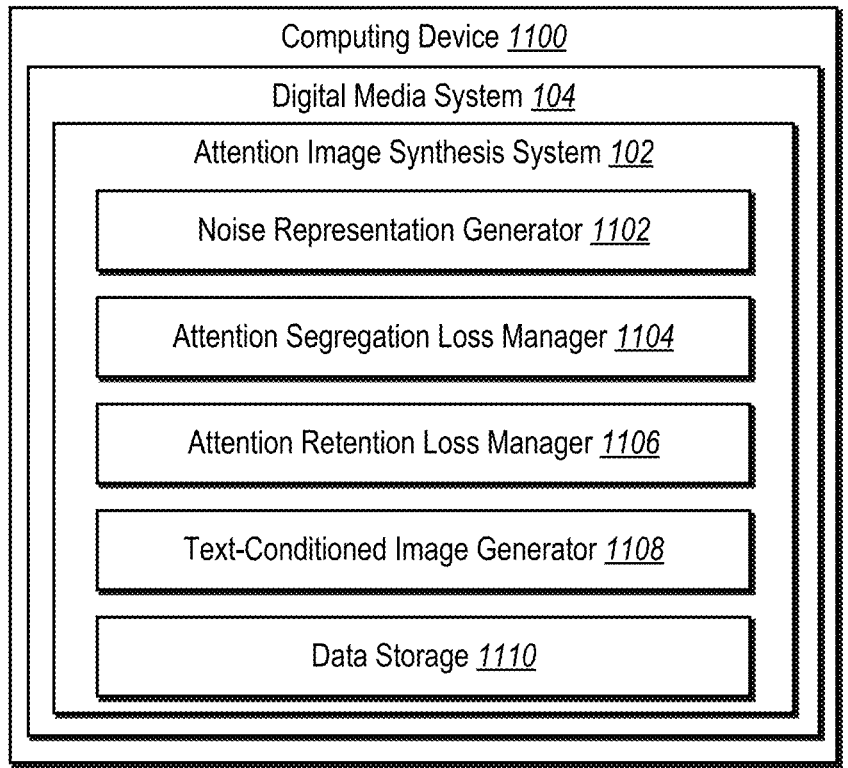
FIG. 11 illustrates an example schematic diagram of the attention image synthesis system in accordance with one or more embodiments.

Turning to FIG. 11, additional detail will now be provided regarding various components and capabilities of the attention image synthesis system 102. In particular, FIG. 11 illustrates an example schematic diagram of a computing device 1100 (e.g., the server(s) 106 and/or the client device 110) implementing the attention image synthesis system 102 in accordance with one or more embodiments of the present disclosure for components 1100-1110. As illustrated in FIG. 11, the attention image synthesis system 102 includes a noise representation generator 1102, an attention segregation loss manager 1104, an attention retention loss manager 1106, a text-conditioned image generator 1108, and a data storage 1110.

The noise representation generator 1102 generates a noise representation. For example, the noise representation generator 1102 generates a noise representation from a text query and a previous noise representation. In particular, the noise representation generator 1102 utilizes different steps of a denoising process to generate a noise representation. Furthermore, the noise representation generator 1102 also generates an initial noise representation for an initial step of the denoising process, which includes a noisy vector. Moreover, the noise representation generator 1102 also integrates conditioning to generate noise representations based on conditioning steps of the denoising process with a text query.

The attention segregation loss manager 1104 determines an attention segregation loss. For example, the attention segregation loss manager 1104 determines an attention segregation loss between attention maps corresponding to a specific denoising step. Further, the attention segregation loss manager 1104 manages the generation of attention maps for denoising steps. Specifically, the attention segregation loss manager 1104 generates attention maps for specific concepts of a text query and further determines the attention segregation loss. Moreover, the attention segregation loss manager 1104 determines the attention segregation loss by comparing attention maps.

The attention retention loss manager 1106 determines an attention retention loss. For example, the attention retention loss manager 1106 determines an attention retention loss between different denoising steps. In particular, the attention retention loss manager 1106 generates attention maps corresponding to different denoising steps and utilizes the attention maps to determine the attention retention loss. Moreover, the attention retention loss manager 1106 determines the attention retention loss by comparing attention maps across different denoising steps.

The text-conditioned image generator 1108 generates text-conditioned images. For example, text-conditioned image generator 1108 collaborates with the noise representation generator 1102, the attention segregation loss manager 1104 and the attention retention loss manager 1106 to generate text-conditioned images. In particular, the text-conditioned image generator 1108 generates modified noise representations utilizing the noise representation generator 1102, the attention segregation loss manager 1104 and the attention retention loss manager 1106. Furthermore, the text-conditioned image generator 1108 utilizes the denoising process conditioned on the text query to generate the text-conditioned image.

The data storage 1110 stores digital images, training data, attention computation mechanisms, various machine learning models, and text queries. For example, the data storage 1110 stores digital images generated from various machine learning models and conditioned on various text queries. Further, the data storage 1110 stores generated text-conditioned images and associated text queries.

Each of the components 1102-1110 of the attention image synthesis system 102 can include software, hardware, or both. For example, the components 1102-1110 can include one or more instructions stored on a computer-readable storage medium and executable by processors of one or more computing devices, such as a client device or server device. When executed by the one or more processors, the computer-executable instructions of the attention image synthesis system 102 can cause the computing device(s) to perform the methods described herein. Alternatively, the components 1102-1110 can include hardware, such as a special-purpose processing device to perform a certain function or group of functions. Alternatively, the components 1102-1110 of the attention image synthesis system 102 can include a combination of computer-executable instructions and hardware.

Furthermore, the components 1102-1110 of the attention image synthesis system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1102-1110 of the attention image synthesis system 102 may be implemented as a stand-alone application, such as a desktop or mobile application. Furthermore, the components 1102-1110 4 of the attention image synthesis system 102 may be implemented as one or more web-based applications hosted on a remote server. Alternatively, or additionally, the components 1102-1110 of the attention image synthesis system 102 may be implemented in a suite of mobile device applications or "apps." For example, in one or more embodiments, the attention image synthesis system 102 can comprise or operate in connection with digital software applications such as ADOBE® CREATIVE CLOUD EXPRESS, ADOBE® PHOTOSHOP, ADOBE® ILLUSTRATOR, ADOBE® PREMIERE, ADOBE® INDESIGN, and/or ADOBE® EXPERIENCE CLOUD. "ADOBE," "PHOTOSHOP," "INDESIGN," and "ILLUSTRATOR". The foregoing are either registered trademarks or trademarks of Adobe Inc. in the United States and/or other countries.

FIGS. 1-11, the corresponding text, and the examples provide a number of different methods, systems, devices, and non-transitory computer-readable media of the attention image synthesis system 102. In addition to the foregoing, one or more embodiments can also be described in terms of flowcharts comprising acts for accomplishing the particular result, as shown in FIG. 12. FIG. 12 may be performed with more or fewer acts. Further, the acts may be performed in different orders. Additionally, the acts described herein may be repeated or performed in parallel with one another or in parallel with different instances of the same or similar acts.

FIG. 12 illustrates a flowchart of a series of acts 1200 for generating a text-conditioned image in accordance with one or more embodiments. FIG. 12 illustrates acts according to one embodiment, alternative embodiments may omit, add to, reorder, and/or modify any of the acts shown in FIG. 12. In some implementations, the acts of FIG. 12 are performed as part of a method. For example, in some embodiments, the acts of FIG. 12 are performed as part of a computer-implemented method. Alternatively, a non-transitory computer-readable medium can store instructions thereon that, when executed by at least one processor, cause a computing device to perform the acts of FIG. 12. In some embodiments, a system performs the acts of FIG. 12. For example, in one or more embodiments, a system includes at least one memory device. The system further includes at least one server device configured to cause the system to perform the acts of FIG. 12.

The series of acts 1200 includes an act 1202 of generating a second noise representation utilizing a second denoising step of the diffusion neural network, an act 1204 of determining an attention segregation loss between attention maps, an act 1206 of determining an attention retention loss between the denoising steps, and an act 1208 of generating a text-conditioned image based on a modified noise representation generated from the second noise representation.

In particular, the act 1202 includes generating, from a text query and a first noise representation from a first denoising step of a diffusion neural network, a second noise representation utilizing a second denoising step of the diffusion neural network, the act 1204 includes determining an attention segregation loss between attention maps corresponding to the second denoising step, the act 1206 includes determining an attention retention loss between the first denoising step and the second denoising step, and the act 1208 includes generating a text-conditioned image based on a modified noise representation generated from the second noise representation based on the attention segregation loss and the attention retention loss.

For example, in one or more embodiments, the series of acts 1200 includes generating a first attention map for the first concept of the text query corresponding to the first denoising step and generating a second attention map for the second concept of the text query corresponding to the first denoising step. In addition, in one or more embodiments, the series of acts 1200 includes determining the attention segregation loss by comparing the first attention map for the first concept of the text query to the second attention map for the second concept of the text query. Further, in one or more embodiments, the series of acts 1200 includes generating a first attention map corresponding to the first denoising step, generating a second attention map corresponding to the second denoising step, and comparing the first attention map corresponding to the first denoising step and the second attention map corresponding to the second denoising step to determine the attention retention loss.

Moreover, in one or more embodiments, the series of acts 1200 includes determining a threshold activation region for the first attention map corresponding to the first denoising step and generating a binary mask for the first attention map corresponding to the first denoising step based on the threshold activation region. Additionally, in one or more embodiments, the series of acts 1200 includes comparing the binary mask with the second attention map corresponding to the second denoising step.

Furthermore, in one or more embodiments, the series of acts 1200 includes generating a combined loss from the attention segregation loss and the attention retention loss, generating the modified noise representation from the combined loss, and utilizing additional steps of the diffusion neural network to generate the text-conditioned image from the modified noise representation. Additionally, in one or more embodiments, the series of acts 1200 includes generating, utilizing a text encoder, a text vector representation from the text query and conditioning the second denoising step utilizing the text vector representation.

Moreover, in one or more embodiments, the series of acts 1200 includes generating a noise representation from the noise vector and the text query utilizing a denoising step of the diffusion neural network, generating, for the denoising step, a first attention map corresponding to the first text concept and a second attention map corresponding to the second text concept, determining an attention segregation loss by comparing the first attention map and the second attention map, generating a modified noise representation from the noise representation utilizing the attention segregation loss, and generating, utilizing additional steps of the diffusion neural network, a text-conditioned image from the modified noise representation.

In addition, in one or more embodiments, the series of acts 1200 includes determining an attention retention loss based on the denoising step and a previous denoising step. Further, in one or more embodiments, the series of acts 1200 determining the attention retention loss by generating a previous noise representation utilizing the previous denoising step of the diffusion neural network and generating a previous attention map corresponding to the previous denoising step.

Moreover, in one or more embodiments, the series of acts 1200 includes comparing an attention map corresponding to the denoising step and the previous attention map corresponding to the previous denoising step to determine the attention retention loss. Furthermore, in one or more embodiments, the series of acts 1200 includes generating the modified noise representation from the noise representation utilizing the attention segregation loss and the attention retention loss.

Additionally, in one or more embodiments, the series of acts 1200 includes generating an additional noise representation corresponding to an additional denoising step from the modified noise representation. Moreover, in one or more embodiments, the series of acts 1200 includes generating, for the additional denoising step, a third attention map corresponding to the first text concept and a fourth attention map corresponding to the second text concept, determining an additional attention segregation loss by comparing the third attention map and the fourth attention map from the additional denoising step, and generating an additional modified noise representation from the additional noise representation utilizing the additional attention segregation loss. Further, in one or more embodiments, the series of acts 1200 includes generating, utilizing a text encoder, a text vector representation from the text query to condition the additional noise representation utilizing the text vector representation.

Moreover, in one or more embodiments, the series of acts 1200 includes generating, from a text query and a first noise representation from a first denoising step of a diffusion neural network, a second noise representation utilizing a second denoising step of the diffusion neural network, determining a first attention map for the first denoising step and a second attention map for the second denoising step, determining an attention retention loss by comparing the first attention map and the second attention map, generating a modified noise representation from the second noise representation utilizing the attention retention loss, and generating a text-conditioned image from the modified noise representation.

Additionally, in one or more embodiments, the series of acts 1200 includes generating, utilizing a text encoder, a text vector representation from the text query to condition the second denoising step utilizing the text vector representation. Further, in one or more embodiments, the series of acts 1200 includes determining a threshold activation region for the first attention map corresponding to the first denoising step, generating a binary mask for the first attention map corresponding to the first denoising step based on the threshold activation region, and comparing the binary mask with the second attention map corresponding to the second denoising step to determine the attention retention loss. Moreover, in one or more embodiments, the series of acts 1200 includes generating, for the first denoising step, a first attention map corresponding to the first concept and a second attention map corresponding to the second concept and comparing the first attention map corresponding to the first concept to the second attention map corresponding to the second concept to determine the attention segregation loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
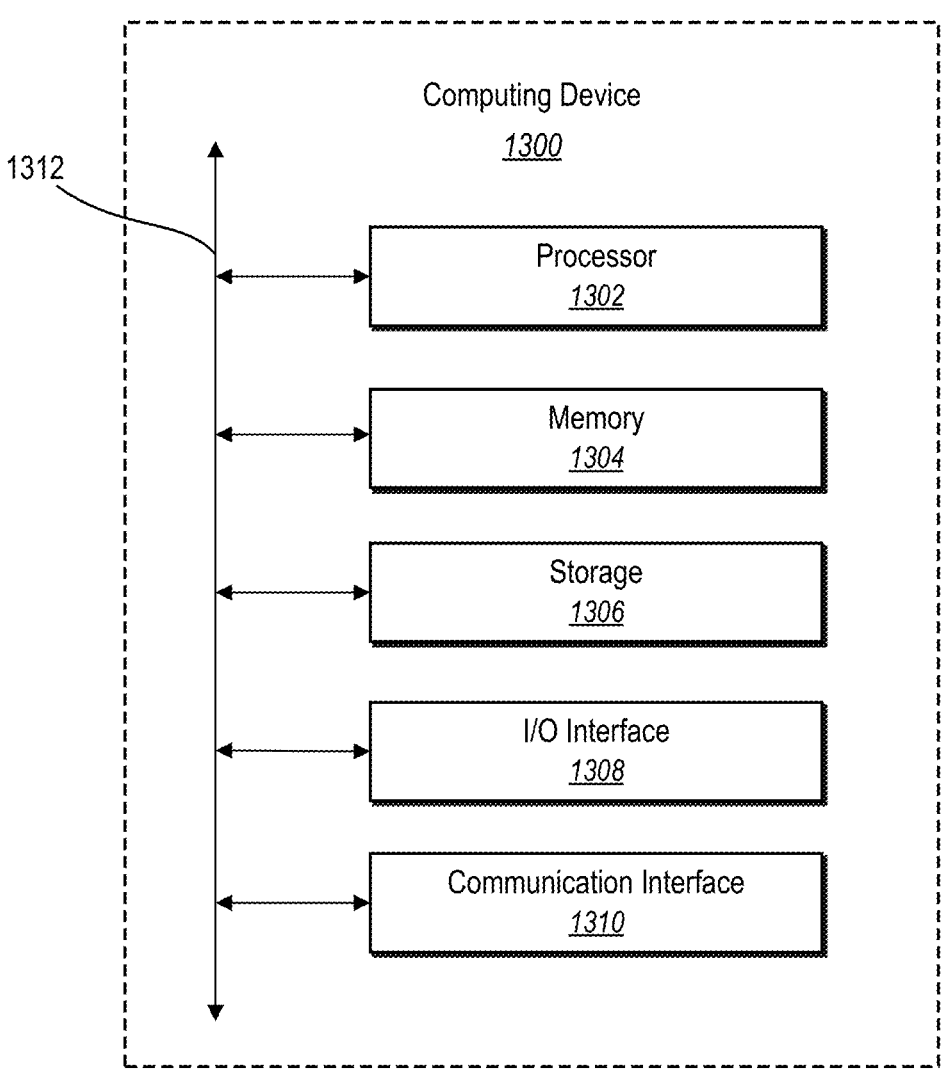
FIG. 13 illustrates a block diagram of an exemplary computing device in accordance with one or more embodiments.

FIG. 13 illustrates a block diagram of an example computing device 1300 that may be configured to perform one or more of the processes described above. One will appreciate that one or more computing devices, such as the computing device 1300 may represent the computing devices described above (e.g., the server(s) 106 and/or the client device 110). In one or more embodiments, the computing device 1300 may be a mobile device (e.g., a mobile telephone, a smartphone, a PDA, a tablet, a laptop, a camera, a tracker, a watch, a wearable device). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 including storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating, from a text query and a first noise representation from a first denoising step of a diffusion neural network, a second noise representation utilizing a second denoising step of the diffusion neural network, wherein the text query comprises a first concept and a second concept;

determining an attention segregation loss between a first attention map and a second attention map corresponding to the second denoising step by comparing a first text embedding of the first concept with the second noise representation to generate the first attention map and comparing a second text embedding of the second concept with the second noise representation to generate the second attention map;

determining an attention retention loss between the first denoising step and the second denoising step based on comparing the first attention map and the second attention map corresponding to the second denoising step with additional attention maps corresponding to the first denoising step; and generating a text-conditioned image based on a modified noise representation generated from the second noise representation based on the attention segregation loss and the attention retention loss.

2. The computer-implemented method of claim 1, further comprising:

generating, utilizing a text encoder, the first text embedding of the first concept from the text query; and generating, utilizing the text encoder, the second text embedding of the second concept from the text query.

3. The computer-implemented method of claim 2, further comprising:

conditioning the second denoising step with the first text embedding and the second text embedding to generate the second noise representation; and conditioning an additional denoising step with the first text embedding and the second text embedding to generate an additional noise representation, wherein conditioning the second denoising step and the additional denoising step comprises providing the first text embedding and the second text embedding as context data to cause the diffusion neural network to focus on specific portions of input data.

4. The computer-implemented method of claim 1, wherein determining the attention retention loss comprises:

generating the first attention map of the first concept of the text query corresponding to the second denoising step and the second attention map of the second concept of the text query corresponding to the second denoising step;

generating the additional attention maps comprising a third attention map of the first concept of the text query corresponding to the first denoising step and a fourth attention map of the second concept of the text query corresponding to the first denoising step; and determining the attention retention loss between the first denoising step and the second denoising step by comparing the first attention map corresponding to the second denoising step with the third attention map corresponding to the first denoising step and comparing the second attention map corresponding to the second denoising step with the fourth attention map corresponding to the first denoising step.

5. The computer-implemented method of claim 4, wherein comparing the first attention map corresponding to the second denoising step and the third attention map corresponding to the first denoising step comprises:

determining a threshold activation region for the third attention map corresponding to the first denoising step; and generating a binary mask for the third attention map corresponding to the first denoising step based on the threshold activation region.

6. The computer-implemented method of claim 5, wherein comparing the first attention map corresponding to the second denoising step and the third attention map corresponding to the first denoising step comprises comparing the binary mask with the first attention map corresponding to the second denoising step.

7. The computer-implemented method of claim 1, wherein generating the text-conditioned image further comprises:

generating a combined loss from the attention segregation loss and the attention retention loss;

generating the modified noise representation from the combined loss; and utilizing additional steps of the diffusion neural network to generate the text-conditioned image from the modified noise representation.

8. The computer-implemented method of claim 1, wherein generating the second noise representation comprises:

generating, utilizing a text encoder, a text vector representation from the text query; and conditioning the second denoising step utilizing the text vector representation.

9. A system comprising:

one or more memory devices comprising a diffusion neural network, a text query comprising a first text concept and a second text concept, and a noise vector; and one or more processors configured to cause the system to:

generate a noise representation from the noise vector and the text query utilizing a denoising step of the diffusion neural network;

generate a first attention map by comparing a first text embedding of the first text concept with the noise representation from the noise vector;

generate a second attention map by comparing a second text embedding of the second text concept with the noise representation from the noise vector;

determine an attention segregation loss between the first attention map of the first text concept and the second attention map of the second text concept by comparing the first attention map and the second attention map;

generate a modified noise representation from the noise representation utilizing the attention segregation loss; and generate, utilizing additional steps of the diffusion neural network, a text-conditioned image from the modified noise representation.

10. The system of claim 9, wherein the one or more processors are configured to cause the system to determine an attention retention loss based on the denoising step and a previous denoising step.

11. The system of claim 10, wherein the one or more processors are configured to cause the system to determine the attention retention loss by:

generating a previous noise representation utilizing the previous denoising step of the diffusion neural network; and generating a previous attention map corresponding to the previous denoising step.

12. The system of claim 11, wherein the one or more processors are configured to cause the system to compare an attention map corresponding to the denoising step and the previous attention map corresponding to the previous denoising step to determine the attention retention loss.

13. The system of claim 10, wherein the one or more processors are configured to cause the system to generate the modified noise representation from the noise representation utilizing the attention segregation loss and the attention retention loss.

14. The system of claim 9, wherein the one or more processors are configured to cause the system to generate an additional noise representation corresponding to an additional denoising step from the modified noise representation.

15. The system of claim 14, wherein the one or more processors are configured to cause the system to:

generate, for the additional denoising step, a third attention map corresponding to the first text concept and a fourth attention map corresponding to the second text concept;

determine an additional attention segregation loss by comparing the third attention map and the fourth attention map from the additional denoising step; and generate an additional modified noise representation from the additional noise representation utilizing the additional attention segregation loss.

16. The system of claim 15, wherein the one or more processors are configured to cause the system to generate, utilizing a text encoder, a text vector representation from the text query to condition the additional noise representation utilizing the text vector representation.

17. A non-transitory computer-readable medium storing executable instructions which, when executed by a processing device, cause the processing device to perform operations comprising:

generating, from a text query and a first noise representation from a first denoising step of a diffusion neural network, a second noise representation utilizing a second denoising step of the diffusion neural network;

determining a first attention map and a second attention map for the first denoising step, wherein the first attention map corresponds to a first concept in the text query and the second attention map corresponds to a second concept in the text query;

determining a third attention map and a fourth attention map for the second denoising step, wherein the third attention map corresponds to the first concept in the text query and the fourth attention map corresponds to the second concept in the text query;

determining an first attention retention loss for the first concept by comparing the first attention map for the first denoising step and the third attention map for the second denoising step, wherein the first attention retention loss indicates a retention of information for the first concept in the text query from the first denoising step to the second denoising step;

determining a second attention retention loss for the second concept by comparing the second attention map for the first denoising step and the fourth attention map for the second denoising step;

generating a modified noise representation from the second noise representation utilizing the first attention retention loss for the first concept and the second attention retention loss for the second concept; and generating a text-conditioned image from the modified noise representation.

18. The non-transitory computer-readable medium of claim 17, wherein generating the second noise representation further comprises generating, utilizing a text encoder, a text vector representation from the text query to condition the second denoising step utilizing the text vector representation.

19. The non-transitory computer-readable medium of claim 17, wherein determining the first attention retention loss further comprises:

determining a threshold activation region for the first attention map corresponding to the first denoising step;

generating a binary mask for the first attention map corresponding to the first denoising step based on the threshold activation region; and comparing the binary mask with the third attention map corresponding to the second denoising step to determine the first attention retention loss.

20. The non-transitory computer-readable medium of claim 17, wherein the operations further comprise determining an attention segregation loss from the text query comprising a first concept and a second concept by:

generating, for the first denoising step, a first attention map corresponding to the first concept and a second attention map corresponding to the second concept; and comparing the first attention map corresponding to the first concept to the second attention map corresponding to the second concept to determine the attention segregation loss.

* * * * *